(12) United States Patent
Orsini et al.

(10) Patent No.: US 12,157,597 B2
(45) Date of Patent: Dec. 3, 2024

(54) END SEAL CARRIAGE VELOCITY DIFFERENTIAL

(71) Applicant: Sealed Air Corporation (US), Charlotte, NC (US)

(72) Inventors: Thomas P. Orsini, Sterling, MA (US); Robert J. Simonelli, Worcester, MA (US); Zi K. Chan, Lancaster, MA (US); Michael A. Kalinowski, Nashua, NH (US); Russell T. Christman, Dunstable, MA (US); John J. Gilbert, Lowell, MA (US)

(73) Assignee: Sealed Air Corporation (US), Charlotte, NC (US)

( * ) Notice: Subject to any disclaimer, the term of this patent is extended or adjusted under 35 U.S.C. 154(b) by 1008 days.

(21) Appl. No.: 17/254,448

(22) PCT Filed: Jun. 18, 2019

(86) PCT No.: PCT/US2019/037642
§ 371 (c)(1),
(2) Date: Dec. 21, 2020

(87) PCT Pub. No.: WO2020/005643
PCT Pub. Date: Jan. 2, 2020

(65) Prior Publication Data
US 2021/0269182 A1    Sep. 2, 2021

Related U.S. Application Data

(60) Provisional application No. 62/691,722, filed on Jun. 29, 2018.

(51) Int. Cl.
*B65B 9/067*    (2012.01)
*B29C 65/00*    (2006.01)
*B29C 65/20*    (2006.01)

(52) U.S. Cl.
CPC .......... *B65B 9/067* (2013.01); *B29C 66/1122* (2013.01); *B29C 65/2046* (2013.01); *B29C 66/43121* (2013.01)

(58) Field of Classification Search
CPC .......... B65B 9/067; B65B 9/08; B65B 9/087; B65B 9/2014; B65B 9/207; B29C 65/2046; B29C 66/1122; B29C 66/43121
See application file for complete search history.

(56) References Cited

U.S. PATENT DOCUMENTS 3,142,599 A    7/1964    Chavannes
3,208,898 A    9/1965    Chavannes et al.
(Continued)

FOREIGN PATENT DOCUMENTS

EP    0999139 A2 * 10/2000
EP    1157930 A2 * 11/2001    ........... B29C 65/224
(Continued)

*Primary Examiner* — Joshua E Rodden
(74) *Attorney, Agent, or Firm* — Jon M. Isaacson

(57) ABSTRACT

A form-fill-seal system includes a tube feeding system, an end seal carriage, and a computing device. The tube feeding system feeds a tube of flexible material at a first velocity. The computing device controls the end seal carriage to cause an increase in a velocity of the end seal carriage to substantially the first velocity, a start of a dwell time of the end seal mechanism on the tube of flexible material while the velocity of the end seal carriage is at substantially the first velocity, and an increase in the velocity of the end seal carriage to a second velocity during the dwell time. The end seal mechanism cuts a package from the tube during the dwell time. The increase in the velocity of the end seal carriage to the second velocity results in an increased distance of the package from the tube.

20 Claims, 12 Drawing Sheets

(56) References Cited

U.S. PATENT DOCUMENTS

| | | | |
|---|---|---|---|
| 3,285,793 A | 11/1966 | Chavannes | |
| 3,508,992 A | 4/1970 | Chavannes | |
| 3,586,565 A | 6/1971 | Fielding | |
| 3,616,155 A | 10/1971 | Chavannes | |
| 3,660,189 A | 5/1972 | Troy | |
| 4,181,548 A | 1/1980 | Weingarten | |
| 4,184,904 A | 1/1980 | Gaffney | |
| 4,219,988 A | 9/1980 | King et al. | |
| 4,415,398 A | 11/1983 | Ottaviano | |
| 4,525,977 A | 7/1985 | Matt | |
| 4,576,669 A | 3/1986 | Caputo | |
| 4,579,516 A | 4/1986 | Caputo | |
| 5,079,902 A | 1/1992 | Seko | |
| 5,160,700 A * | 11/1992 | Anderson | A61L 2/206 422/294 |
| 5,348,984 A | 9/1994 | Lee | |
| 5,433,063 A * | 7/1995 | Kovacs | B65B 25/146 53/550 |
| 5,462,974 A | 10/1995 | Lee | |
| 5,667,728 A | 9/1997 | Lee | |
| 6,800,162 B2 | 10/2004 | Kannankeril | |
| 6,982,113 B2 | 1/2006 | Kannankeril | |
| 7,018,495 B2 | 3/2006 | Kannankeril | |
| 7,165,375 B2 | 1/2007 | O'Dowd | |
| 7,220,476 B2 | 5/2007 | Sperry et al. | |
| 7,223,461 B2 | 5/2007 | Kannankeril | |
| 7,429,304 B2 | 9/2008 | Mcnamara et al. | |
| 7,721,781 B2 | 5/2010 | Sperry et al. | |
| 7,950,433 B2 | 5/2011 | Sperry et al. | |
| 8,844,919 B2 * | 9/2014 | Motoyoshi | B65H 39/00 270/32 |
| 2004/0128957 A1 | 7/2004 | Guzman | |
| 2014/0314978 A1 | 10/2014 | Lepine et al. | |
| 2015/0075114 A1 | 3/2015 | Murch et al. | |

FOREIGN PATENT DOCUMENTS

| | | | | |
|---|---|---|---|---|
| EP | 1442984 A1 * | 8/2004 | | B29C 65/18 |
| WO | 2018085471 A2 | 5/2018 | | |

* cited by examiner

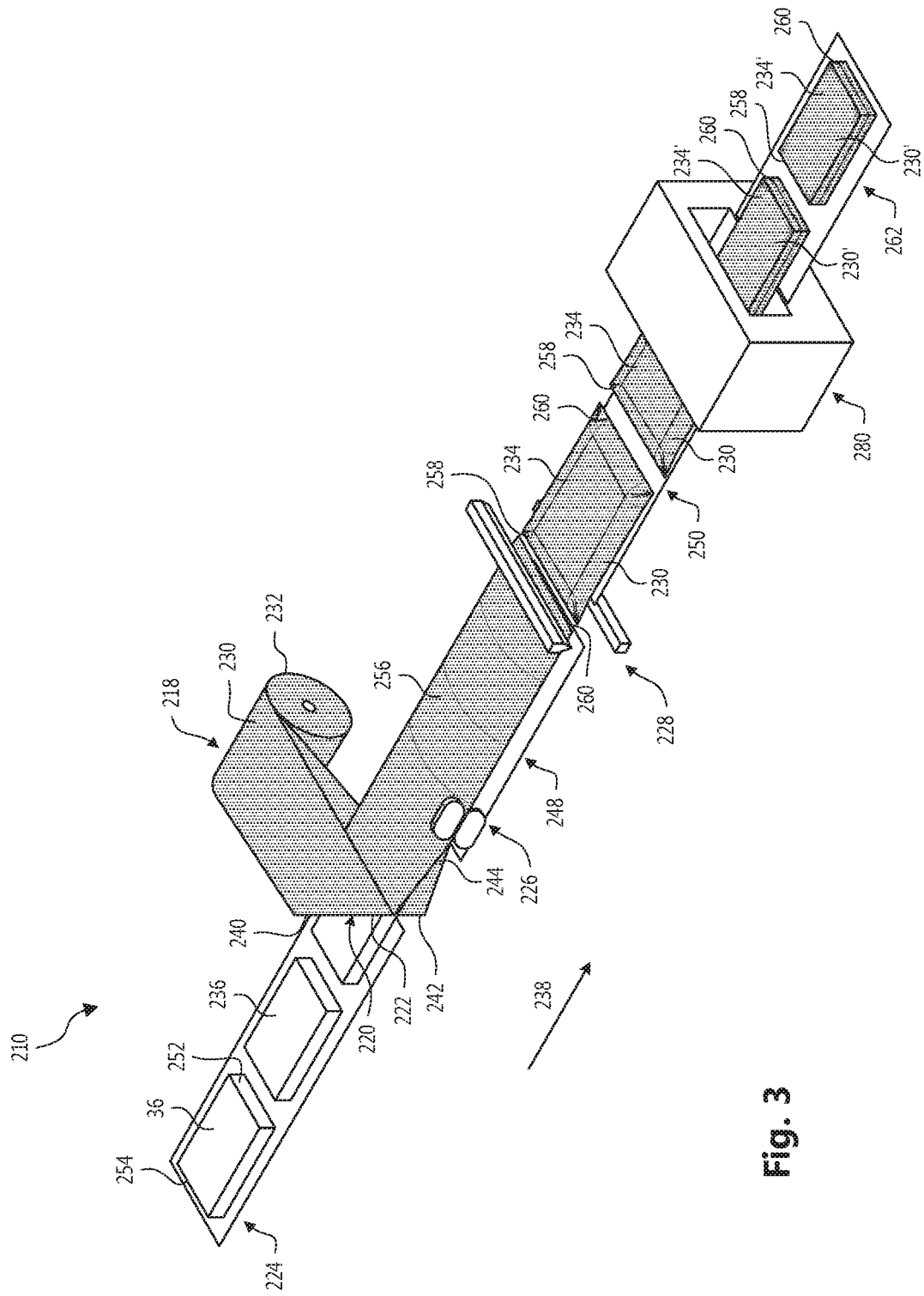

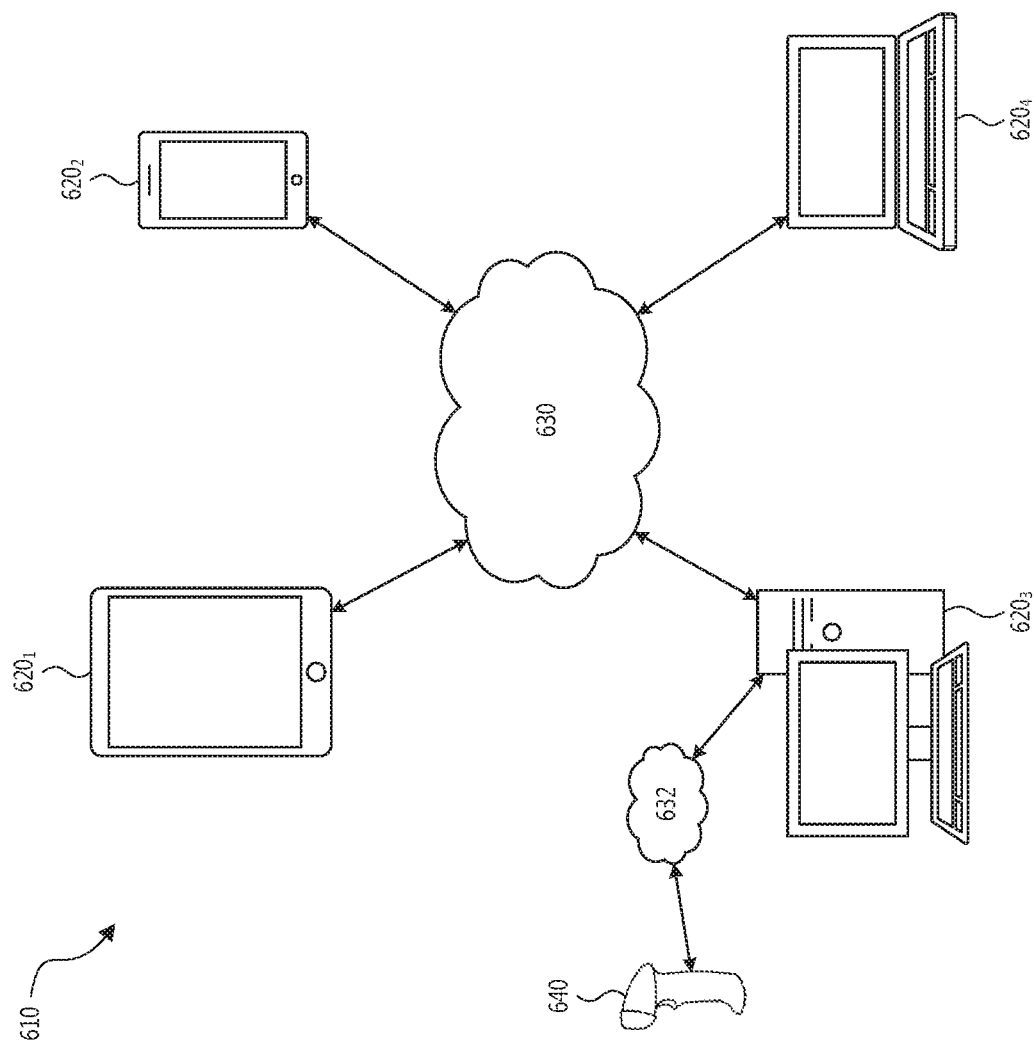

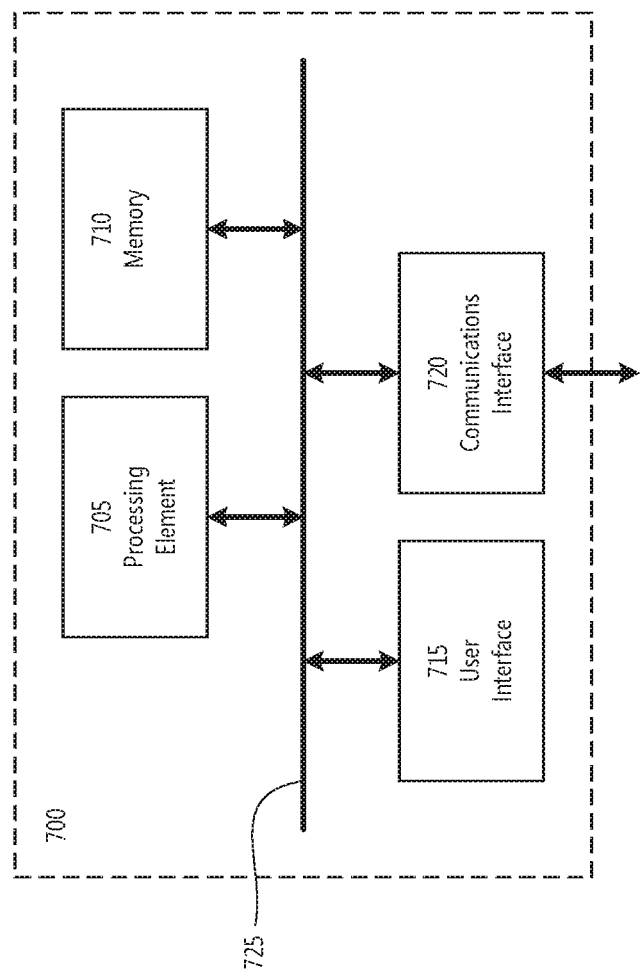

END SEAL CARRIAGE VELOCITY DIFFERENTIAL

BACKGROUND

The present disclosure is in the technical field of packaging machines. More particularly, the present disclosure is directed to separation of packages formed in form-fill-seal machines by creating a velocity differential of an end seal carriage.

Consumers frequently purchase goods from mail-order or internet retailers, which package and ship the goods to the purchasing consumer via a postal service or other carrier. Millions of such packages are shipped each day. These items are normally packaged in small containers, such as a box or envelope. As the number of such packages increases, the speed and reliability of packaging these items are significant concerns to retailers.

Some goods are packaged for shipping using form-fill-seal systems. These systems form a tube of flexible material (e.g., a polyethylene tube, a tube of cushioned mailer layers, a tube of inflated air cellular material, etc.) in a manner that allows an object or a set of objects to be inserted inside of the tube of flexible material. After the tube is filled with an object or set of objects, a package can be created by sealing and cutting the flexible material on either side of the object or set of objects. The resulting package can be used to ship the object or set of objects to a customer.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a method includes feeding a tube of flexible material at a first velocity through a portion of a form-fill-seal system. The form-fill-seal system includes a movable end seal carriage that includes an end seal mechanism. The method further includes increasing a velocity of the end seal carriage to substantially the first velocity and starting a dwell time of the end seal mechanism on the tube of flexible material while the velocity of the end seal carriage is at substantially the first velocity. The end seal mechanism is configured to cut a package from the tube during the dwell time. The method further includes increasing the velocity of the end seal carriage to a second velocity during the dwell time. The method further includes increasing the velocity of the end seal carriage results in an increased distance of the package from the tube.

In one example, the end seal mechanism is in contact with the tube and in contact with the package during a first portion of the dwell time when the velocity of the end seal carriage is at substantially the first velocity. In another example, the end seal mechanism is no longer in contact with the tube and remains in contact with the package during a second portion of the dwell time when the velocity of the end seal carriage is at the second velocity. In another example, the method further includes cutting, by the end seal mechanism, the package from the tube to form a trailing end of the package and a leading end of the tube during the first portion of the dwell time. In another example, the method further includes forming, by the end seal mechanism, a leading seal in the tube near the leading end of the tube during the first portion of the dwell time. In another example, the method further includes forming, by the end seal mechanism, a trailing seal in the package near the trailing end of the tube during the first portion of the dwell time.

In another example, the end seal mechanism includes an upper jaw and a lower jaw. In another example, starting the dwell time includes extending the upper and lower jaws into an extended position at which the upper and lower jaws contact the tube. In another example, the velocity of the end seal carriage is increased to the second velocity in response to the upper and lower jaws reaching the extended position. In another example, the method further includes ending the dwell time while the velocity of the end seal carriage is greater than the first velocity, where ending the dwell time includes retracting the upper and lower jaws from the extended position until the upper and lower jaws are no longer in contact with the package.

In another example, the flexible material includes one or more of a polyethylene film, an air cellular material, or a heat-shrinkable film. In another example, the tube is an open tube of an air cellular material that has been folded longitudinally so that longitudinal edges of the air cellular material are in an overlapping position.

In another embodiment, a system includes a tube feeding system, an end seal carriage, and a computing device. The tube feeding system is configured to feed a tube of flexible material at a first velocity. The end seal carriage configured to be moved with respect to the tube of flexible material, the end seal carriage including an end seal mechanism. The computing device is configured to control the end seal carriage to cause (i) an increase in a velocity of the end seal carriage to substantially the first velocity, (ii) a start of a dwell time of the end seal mechanism on the tube of flexible material while the velocity of the end seal carriage is at substantially the first velocity, where the end seal mechanism is configured to cut a package from the tube during the dwell time, and (iii) an increase in the velocity of the end seal carriage to a second velocity during the dwell time, where increasing the velocity of the end seal carriage results in an increased distance of the package from the tube.

In one example, the end seal mechanism is in contact with the tube and in contact with the package during a first portion of the dwell time when the velocity of the end seal carriage is at substantially the first velocity. In another example, the end seal mechanism is no longer in contact with the tube and remains in contact with the package during a second portion of the dwell time when the velocity of the end seal carriage is at the second velocity.

In another example, the end seal mechanism includes an upper jaw and a lower jaw. In another example, the computing device configured to control the end seal carriage to cause the start of the dwell time by bringing the upper and lower jaws into an extended position at which the upper and lower jaws contact the tube. In another example, the computing device is configured to control the end seal carriage to cause the increase in the velocity of the end seal carriage to the second velocity in response to the upper and lower jaws reaching the extended position. In another example, the computing device is further configured to control the end seal carriage to cause an end of the dwell time while the velocity of the end seal carriage is greater than the first velocity, where the end of the dwell time includes retracting the upper and lower jaws from the extended position until the upper and lower jaws are no longer in contact with the package.

In another embodiment, a computer-readable medium has instructions embodied thereon for controlling a tube feeding system and an end seal carriage of a form-fill-seal system. The instructions comprise instructions that, in response to execution by a computing device, cause the computing device to (i) cause the tube feeding system to feed a tube of flexible material at a first velocity, (ii) increase a velocity of the end seal carriage to substantially the first velocity, wherein the end seal carriage includes an end seal mechanism, (iii) start of a dwell time of the end seal mechanism on the tube of flexible material while the velocity of the end seal carriage is at substantially the first velocity, where the end seal mechanism is configured to cut a package from the tube during the dwell time, and (iv) increase the velocity of the end seal carriage to a second velocity during the dwell time, where increasing the velocity of the end seal carriage results in an increased distance of the package from the tube.

In one example, the end seal mechanism is in contact with the tube and in contact with the package during a first portion of the dwell time when the velocity of the end seal carriage is at substantially the first velocity. In another example, the end seal mechanism is no longer in contact with the tube and remains in contact with the package during a second portion of the dwell time when the velocity of the end seal carriage is at the second velocity.

In another example, the end seal mechanism includes an upper jaw and a lower jaw. In another example, the instructions that, in response to execution by the computing device, cause the computing device to start of the dwell time further comprise instructions that, in response to execution by a computing device, cause the computing device to bring the upper and lower jaws into an extended position at which the upper and lower jaws contact the tube. In another example, the instructions that, in response to execution by the computing device, cause the computing device to increase the velocity of the end seal carriage to the second velocity further comprise instructions that, in response to execution by a computing device, cause the computing device to increase the velocity of the end seal carriage to the second velocity in response to the upper and lower jaws reaching the extended position. In another example, the instructions that, in response to execution by the computing device, further cause the computing device to end the dwell time while the velocity of the end seal carriage is greater than the first velocity, wherein end of the dwell time includes retracting the upper and lower jaws from the extended position until the upper and lower jaws are no longer in contact with the package.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein:

FIG. 3 depicts an embodiment of a form-fill-seal system that forms heat-shrunk packages, in accordance with the embodiments disclosed herein;

FIG. 9 depicts an example embodiment of a system that may be used to implement some or all of the embodiments described herein; and FIG. 10 depicts a block diagram of an embodiment of a computing device, in accordance with the embodiments described herein.

DETAILED DESCRIPTION

Some goods are packaged for shipping using form-fill-seal systems. Because speed and reliability of packaging objects are significant concerns to retailers, it would be advantageous for these form-fill-seal systems to quickly and reliably package objects in packages to form shippable packages. The present disclosure describes embodiments of movable end seal carriages that are controlled in a way to encourage package separation, thereby reducing the likelihood that a package remains sealed to the tube of flexible material from which it was formed.

Figure 1:
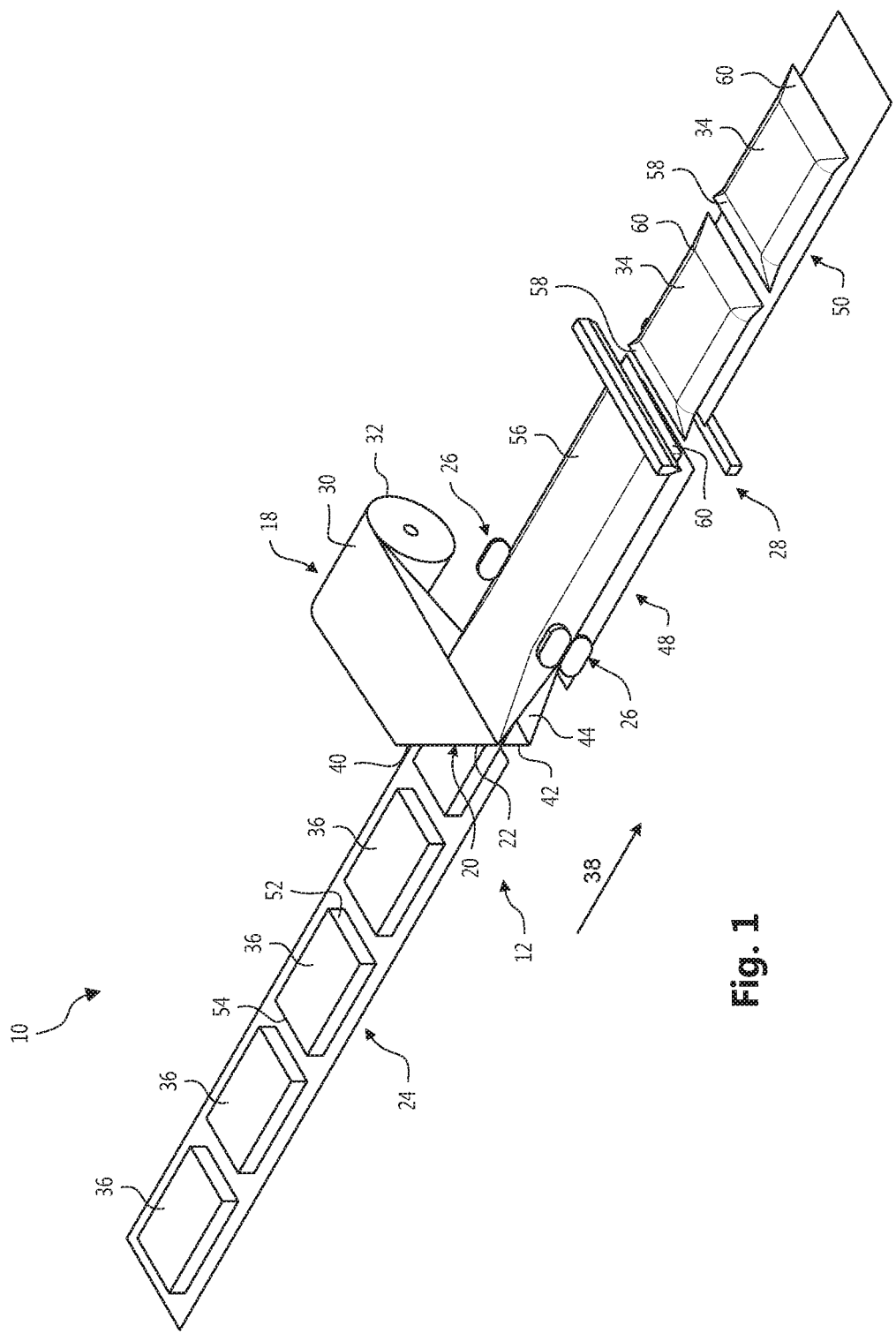
FIG. 1 depicts an embodiment of a form-fill-seal system that forms film packages, in accordance with the embodiments disclosed herein.

FIG. 1 depicts an embodiment of a system 10 that includes a packaging system 12. In the depicted embodiment, the packaging system 12 is a continuous flow wrap machine (e.g., a form-fill-seal wrapper). In other embodiments, the packaging system 12 is a non-continuous packaging system. In the depicted embodiment, the packaging system 12 includes a film dispenser 18, a transfer head 20 including an inverting head 22, an infeed conveyor 24, a longitudinal sealer 26, and an end seal mechanism 28, as will be described in more detail herein. Examples of continuous flow wrap machines are described, for example, in U.S. Pat. No. 4,219,988, U.S. Patent Application No. 62/157,164, and PCT Application No. PCT/US2016/030630, the contents of which are incorporated herein by reference in their entirety, and are available from Sealed Air Corporation (Charlotte, NC) under the Shanklin FloWrap Series trademark.

The film dispenser 18 of the continuous flow wrap machine supplies a web of film 30 from roll 32. Systems for supplying webs of film are known in art and may include unwind mechanisms and other features. In some embodiments, the film 30 on the roll 32 is a center folded film. In other embodiments, the film 30 on roll 32 is a flat wound film. In some embodiments, the film 30 includes any sheet or film material suitable for packaging objects 36, in particular for flexible packages 34 for use as a mailer containing an object. Suitable materials include polymers, for example thermoplastic polymers (e.g., polyethylene), that are suitable for heat sealing. In some embodiments, the film 30 has a thickness of any of at least 2, 3, 5, 7, 10, and 15 mils; and/or at most any of 25, 20, 16, 12, 10, 8, 6 and 5 mils. In some embodiments, the film 30 is multilayered, and has an outer layer adapted for heat sealing the film to itself to form a seal.

The transfer head 20 of the packaging system 10 receives the web of film 30 from the film dispenser 18. The transfer head 20 is adapted to manage (e.g., form) the web of film 30 into a configuration for eventual sealing into a tube. In the depicted embodiment, the transfer head 20 is an inverting head 22 of continuous flow wrap that receives a center folded web of film 30 from the film dispenser 18 and redirects the web of film over the top and bottom inverting head arms 40, 42 to travel in a conveyance direction 38 by turning the web of film inside out. In this manner, the transfer head 20 is adapted to manage the web of film 30 to provide an interior space 44 bounded by the film 30.

In some embodiments, the transfer head 20 in the configuration of a forming box receives the lay flat web of film 30 from the film dispenser 18 and redirects the web of film over the forming head to travel in the conveyance direction 38 by turning the web of film inside out. In this manner, the transfer head 20 is adapted to manage the web of film 30 to provide an interior space 44 bounded by film 30.

The infeed conveyor 24 of packaging system 12 is adapted to transport a series of objects 36 and sequentially deliver them in the conveyance direction 38. In some embodiments, the infeed conveyor is adapted to convey a series of objects 36. In the embodiment depicted in FIG. 1, the objects 36 have a similar size. In other embodiments, the objects have varied or differing sizes. Within the series of objects 36 in sequential order, a "preceding" object is upstream from a "following" object. The infeed conveyor 24 is configured to deliver in repeating fashion a preceding object upstream from a following object into the interior space 44 of the web of film 30. In some embodiments, the objects 36 are delivered in spaced or gapped arrangement from each other.

An "object," as used herein, may comprise a single item for packaging, or may comprise a grouping of several distinct items where the grouping is to be in a single package. Further, an object may include an accompanying informational item, such as a packing slip, tracking code, a manifest, an invoice, or printed sheet comprising machine-readable information (e.g., a bar code) for sensing by an object reader (e.g., a bar code scanner).

Downstream from the infeed conveyor 24 is an object conveyor 48, which is adapted to support and transport the web of film 30 and the object 36 downstream together to the end seal mechanism 28. A discharge conveyor 50 transports the series of packages 34 from the end seal mechanism 28.

As each object 36 of the series of objects sequentially travels through the packaging system 12, its position within the machine is tracked. This is accomplished by ways known in the art. For example, an infeed eye system (horizontal or vertical) determines the location of the front edge 52 of each object and the location of the rear edge 54 of each object as the object travels along the conveyor. This location information is communicated to a controller (i.e., a programmable logic controller or "PLC"). A system of encoders and counters, also in communication with the PLC, determines the amount of travel of the conveyor on which the object is positioned. In this manner, the position of the object 36 itself is determined and known by the PLC. The PLC is also in communication with the end seal mechanism 28 to provide the object position information for a particular object to these unit operations.

In the depicted embodiment, the packaging system 12 includes longitudinal sealers 26 adapted to continuously seal sides of the film 30 together to form a tube 56 enveloping one of the objects 36. In the depicted embodiment, the longitudinal sealers 26 are located at sides of the tube 56, where each of the longitudinal sealers 26 forms a side seal between two edge portions of the film 30. In other the A embodiments, ere-longitudinal sealer 26 may be located beneath the tube 56, where the sealer may form, for example, a center fin seal between two edge portions of the web of film 30. As two edge portion of film 30 are brought together at the longitudinal sealer 26 to form the tube 56, they are sealed together, for example, by a combination of heat and pressure, to form a continuous fin or a side seal. Appropriate longitudinal sealers are known in the art, and include, for example, heat sealers.

The packaging system 12 includes end seal mechanism 28, which is adapted to provide or perform in repeating fashion, while the tube 56 is traveling: (i) a trailing edge seal 58 that is transverse to tube 56 and upstream from a preceding object to create flexible package 34 and (ii) a leading edge seal 60 transverse to the tube 56 and downstream from a following object. Further, the end seal mechanism 28 is adapted to sever the flexible package 34 from the tube 56 by cutting between the trailing edge seal 58 and the leading edge seal 60. Generally, the end seal mechanism 28 uses temperature and pressure to make two seals (trailing edge seal 58 and leading edge seal 60) and cuts between them, thus creating the final, trailing seal of one finished, preceding package and the first, leading edge seal of the following package. Advantageously, the end seal mechanism may be adapted to simultaneously sever the flexible package 34 from the tube 56 while providing the trailing edge seal 58 and leading edge seal 60.

Useful end seal mechanisms are known in the art. These include, for example, rotary type of end seal mechanisms, having matched heated bars mounted on rotating shafts. As the film tube passes through the rotary type, the rotation is timed so it coincides with the gap between objects. A double seal is produced and the gap between the two seals is cut by an integral blade to separate individual packs. Another type of end seal mechanism is the box motion type, having a motion that describes a "box" shape so that its horizontal movement increases the contact time between the seal bars and the film. Still another type of end seal mechanism is the continuous type, which includes a sealing bar that moves down with the tube while sealing.

Figure 2:
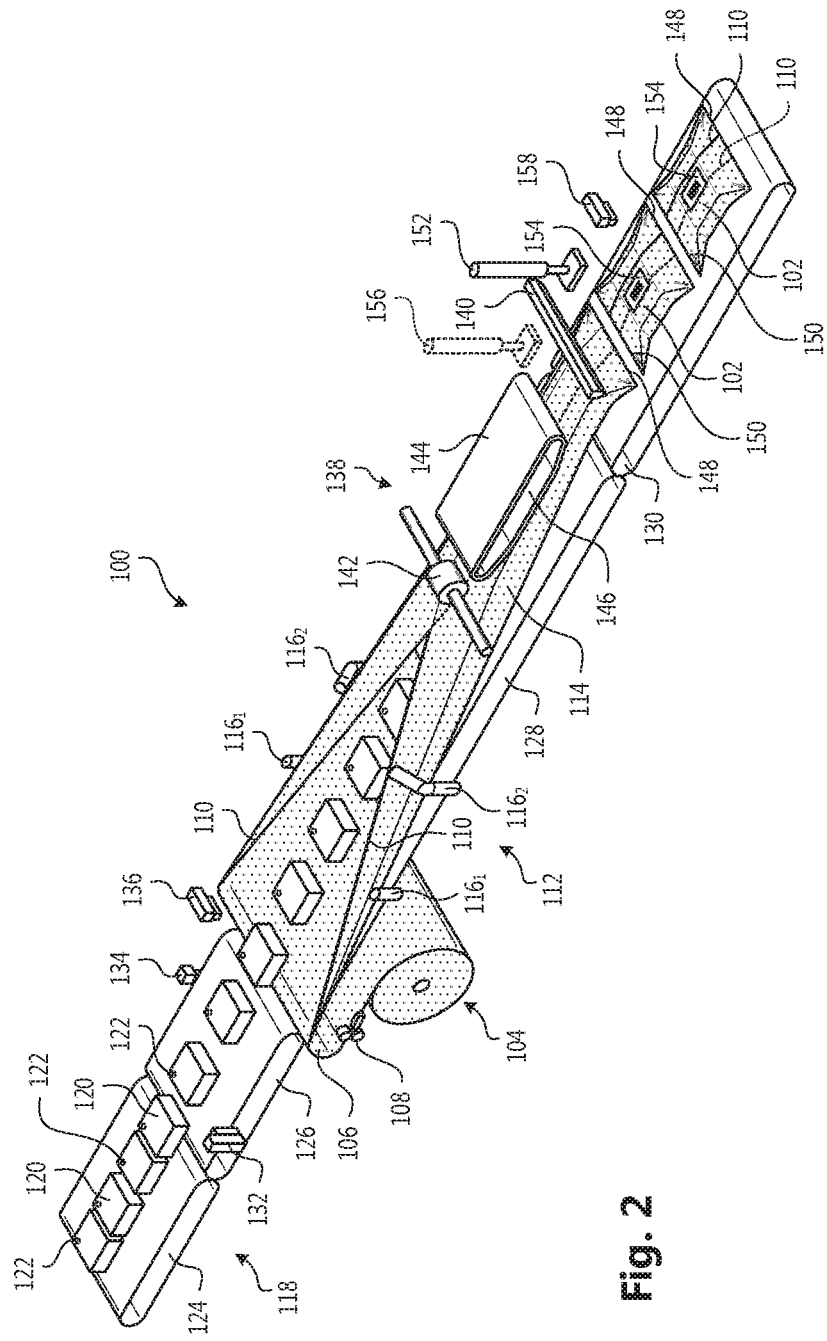
FIG. 2 depicts an embodiment of a form-fill-seal system that forms cushion packages, in accordance with the embodiments disclosed herein.

Depicted in FIG. 2 is an embodiment of a system 100 for creating cushion packages 102. The system 100 includes a supply 104 of cushion material 106. In the depicted embodiment, the supply 104 is a roll of the cushion material 106. In other embodiments, the supply 104 could be sheets of the cushion material 106, fanfolded stacks of the cushion material 106, or any other supply of the cushion material 106. In the depicted embodiment, the cushion material 106 is a flexible sheet material.

In some examples, the cushion material 106 is an inflated air cellular material. As used herein, the term "air cellular material" herein refers to bubble cushioning material, such as BUBBLE WRAP® air cushioning material sold by Sealed Air Corporation, where a first film or laminate is formed (e.g., thermoformed, embossed, calendared, or otherwise processed) to define a plurality of cavities and a second film or laminate is adhered to the first film or laminate in order to close the cavities. Examples of air cellular materials are shown in U.S. Pat. Nos. 3,142,599, 3,208,898, 3,285,793, 3,508,992, 3,586,565, 3,616,155, 3,660,189, 4,181,548, 4,184,904, 4,415,398, 4,576,669, 4,579,516, 6,800,162, 6,982,113, 7,018,495, 7,165,375, 7,220,476, 7,223,461, 7,429,304, 7,721,781, and 7,950,433, and U.S. Published Patent Application Nos. 2014/0314978 and 2015/0075114, the disclosures of which are hereby incorporated by reference in their entirety.

In some examples, the cushion material 106 is a foamed material. Methods for manufacturing such foamed materials are well known, as disclosed in e.g., U.S. Pat. Nos. 5,348,984, 5,462,974, and 5,667,728, the contents of all of which are incorporated herein by reference in their entirety. A common material used to form foamed materials is low density polyethylene (LDPE). In some embodiments, foamed materials have a density ranging from about 0.5 to about 15 pounds/ft$^3$. Foamed materials may be in the form of a sheet or plank having a thickness ranging from about 0.015 to about 5 inches. In producing the sheets of foamed materials, any conventional chemical or physical blowing agents may be used, such as a physical blowing agent (e.g., carbon dioxide, ethane, propane, n-butane, isobutane, pentane, hexane, butadiene, acetone, methylene chloride, any of the chlorofluorocarbons, hydrochlorofluorocarbons, hydrofluorocarbons, or any mixture thereof). If desired or necessary, various additives may also be included with the polymer, such as a nucleating agent (e.g., zinc oxide, zirconium oxide, silica, talc, etc.) and/or an aging modifier (e.g., a fatty acid ester, a fatty acid amide, a hydroxyl amide, etc.).

In one particular embodiment, the supply 104 includes a roll of an inflatable web of air cellular material in a deflated state. As the inflatable web is unrolled, it is fed through an inflation and sealing machine 108. The inflation and sealing machine 108 inflates and seals cells in the air cellular material so that the air cellular material is in an inflated state. In this embodiment, the cushion material 106 is the inflated air cellular material. Examples of inflation and sealing machines are described in U.S. Pat. No. 7,721,781 and U.S. Published Patent Application No. 2014/0314978, the contents of which are hereby incorporated by reference in their entirety.

The cushion material 106 has longitudinal edges 110. The system 100 also includes a folding system 112. In the depicted embodiment, the folding system 112 includes two pairs of rollers: rollers 1161 and rollers 1162. In the depicted embodiment, the rollers 1161 are oriented vertically and the rollers 1162 are oriented at a non-vertical and non-horizontal angle, however, the rollers 1161 and 1162 could be any oriented at any desired angle. The folding system 112 folds the cushion material 106 from an unfolded state (e.g., the state of the cushion material 106 when it is unrolled from the supply 104) into a tube 114 of the cushion material 106. In the tube 114 of the cushion material 106, the longitudinal edges 110 of the cushion material 106 are in an overlapping position.

The system 100 also includes a conveyor system 118 that is configured to feed objects 120 and/or the cushioning material 106. As used herein, an "object" may comprise a single item for packaging or grouping of several distinct items where the grouping is to be in a single package. Further, an object may include an accompanying informational item, such as a packing slip, tracking code, a manifest, an invoice, or printed sheet comprising machine-readable information (e.g., a bar code) for sensing by an object reader (e.g., a bar code scanner). In the depicted embodiment, each of the objects 120 includes an object identifier 122. In some examples, the object identifier includes one or more of a barcode, a quick response (QR) code, a radio frequency identification (RFID) tag, any other form a machine-readable information, human-readable information, or any combination thereof.

In the depicted embodiment, the conveyor system 118 includes an infeed conveyor 124, an infeed spacing conveyor 126, a machine conveyor 128, and an end conveyor 130. The infeed conveyor 124 is configured to feed the objects 120. The objects 120 are at an uncontrolled spacing on the infeed conveyor 124. The infeed spacing conveyor 126 is configured to feed the objects 120 after they leave the infeed conveyor 124. The infeed spacing conveyor 126 is configured to be controlled by a controller or other computing device (not shown) to provide a particular spacing between the objects 120. In the depicted embodiment, the system 100 includes a sizing sensor 132, a spacing sensor 134, and an identifier sensor 136. The sizing sensor 132 is configured to determine one or more dimensions of the objects 120, such as a longitudinal length of the objects 120, a height of the objects 120, or a transverse width of the objects 120. The spacing sensor 134 is configured to determine a longitudinal spacing between consecutive objects 120. In some examples, the sizing sensor 132, the spacing sensor 134, and the identifier sensor 136 are configured to send signals to the controller or other computing device, and the controller or other computing device is configured to control the infeed spacing conveyor 126 and/or any other component of the system 100. In some embodiments, each of the sizing sensor 132, the spacing sensor 134, and the identifier sensor 136 includes one or more of an optical sensor (e.g., a visible light sensor, a laser sensor, or any other electromagnetic sensor), an RFID tag reader, a barcode reader, a camera, an acoustic sensor (e.g., an ultrasonic sensor), a mechanical sensor (e.g., a plunger), or any other type of sensor.

As shown in FIG. 2, the cushion material 106 is configured to be fed over the machine conveyor 128 so that the objects 120 are fed onto the cushion material 106. The machine conveyor 128 supports and feeds both the cushion material 106 and the objects 120. In the depicted embodiment, the objects 120 are fed onto the cushion material 106 while the cushion material 106 is in an unfolded state (e.g., before the longitudinal edges 110 are in the overlapping position). The conveyor system 118 is configured to feed the objects 120 onto the cushion material 106 so that the tube 114 of the cushion material 106 is formed around the objects 120.

In the depicted embodiment, the system 100 includes a holding mechanism 138 configured to hold the longitudinal edges 110 in the overlapping position as the cushion material 106 is fed between the folding system 112 and a sealing mechanism 140. In some embodiments, the holding mechanism 138 includes a roller 142 located above the longitudinal edges 110 in the overlapping position, and the roller 142 holds the longitudinal edges 110 in the overlapping position after the cushion material 106 has been folded. In some embodiments, the holding mechanism 138 includes an overhead conveyor 144 that has a hanging underside 146. The hanging underside 146 is configured to contact the tube 114 of the cushion material 106 where the longitudinal edges 110 are in the overlapping position. In some embodiments, such as the embodiment depicted in FIG. 1, the holding mechanism 138 includes both the roller 142 and the overhead conveyor 144.

The sealing mechanism 140 is configured to provide or perform, in repeating fashion, while the tube 114 is traveling: (i) a leading edge seal 148 that is transverse to tube 114, (ii) a trailing edge seal 150 transverse to the tube 114, and (iii) a transverse cut between the leading edge seal 148 and the trailing edge seal 150. Each of the leading edge seal 148 and the trailing edge seal 150 seals the cushion material 106 with the longitudinal edges 110 in the overlapping position. Preferably, one or more of the objects 120 are located inside of each of the cushion packages 102 between one of the leading edge seals 148 and one of the leading trailing edge seals 150. In some embodiments, the sealing mechanism 140 uses temperature and/or pressure to make two transverse seals (leading edge seal 148 and trailing edge seal 150) and transversely cuts between them. These transverse cuts create cushion packages 102 separated from the tube 114 of the cushion material 106. Advantageously, the sealing mechanism 140 may be adapted to simultaneously sever the cushion packages 102 from the tube 114 while forming the leading edge seal 148 and trailing edge seal 150.

Various forms of sealing mechanisms 140 are known in the art. These include, for example, rotary end seal mechanisms that have matched heated bars mounted on rotating shafts. As the film tube passes through the rotary type, the rotation is timed so it coincides with the gap between products. A double seal is produced and the gap between the two seals is cut by an integral blade to separate individual packages. Another type of sealing mechanisms 140 is the box motion type, having a motion that describes a "box" shape so that its horizontal movement increases the contact time between the seal bars and the film. Still another type of sealing mechanisms 140 is the continuous type, which includes a sealing bar that moves down with the tube 114 while sealing. In some cases, the system 100 feeds cushion material 106 from the supply 104 intermittently in order to form cushion packages 102 intermittently. In these cases, the sealing mechanisms 140 may not need to move in a downstream direction to form the transverse seals and cuts. In other cases, the system 100 feeds cushion material 106 from the supply 104 continuously in order to form cushion packages 102 continuously. In these cases, the sealing mechanisms 140 may move in a downstream direction while forming the transverse seals and cuts.

The system 100 includes a labeling mechanism 152 that is capable of applying labels 154 to exteriors of the cushion packages 102. In some embodiments, the labels 154 include indications of the objects 120 inside the cushion packages 102, indications of shipping destinations of the objects 120 inside the cushion packages 102, and/or indications of orders associated with the objects 120 inside the cushion packages 102. In some embodiments, the labeling mechanism 152 includes a printer that prints the labels 154. In some cases, the printer prints the labels 154 directly on the exterior of the cushion packages 102. In other cases, the printer prints the labels 154 on an adhesive medium and labeling mechanism 152 applies the adhesive medium to the exterior of the of the cushion packages 102. In the depicted embodiment, the labeling mechanism 152 is located downstream of the sealing mechanism 140. In other embodiments, a labeling mechanism 156 can be located upstream of the sealing mechanism 140 (as shown in dashed lines).

In the depicted embodiment, the system 100 includes a discharge scanner 158. The discharge scanner 158 is configured to scan one or more of the cushion packages 102 themselves, the labels 154 on the cushion packages 102, or the object identifiers 122 on the objects 120 insides of the cushion packages 102. The data generated by the discharge scanner 158 may be used to verify that the objects 120 have been wrapped in one of the cushion packages 102. In some embodiments, the data generated by the discharge scanner 158 may be communicated from the system 100 to other systems that may process the cushion packages 102, as will be discussed in greater detail below.

FIG. 3 depicts an embodiment of a shrink wrap system 210. In the depicted embodiment, the shrink wrap system 210 is a continuous shrink wrap system that is capable of receiving a stream of objects, independently surrounding each of the objects with shrinkable wrap, and then shrinking the shrinkable wrap around the objects. In other embodiments, the shrink wrap system 210 is a non-continuous packaging system. In the depicted embodiment, the shrink wrap system 10 includes a shrink film dispenser 218, a transfer head 220 including an inverting head 222, an infeed conveyor 224, a longitudinal sealer 226, and an end seal mechanism 228, as will be described in more detail herein.

The shrink film dispenser 218 of the continuous flow wrap machine supplies a web of heat-shrinkable film 230 from roll 232. Systems for supplying webs of film are known in art and may include unwind mechanisms and other features. Heat-shrinkable films have the ability, upon being exposed to a certain temperature, to shrink or to generate shrink tension when used in a packaging application. Once a product is enclosed in the heat shrinkable film, the packaged product is subjected to an elevated temperature by subjecting the packaged product to a hot fluid, such as hot air or hot water. This causes the film to shrink forming a tight wrap surrounding the enclosed packaged product. In some embodiments, heat-shrinkable film may be opaque. Embodiments of opaque shrink films are described in U.S. Application No. 62/370,258, entitled "Opaque, Heat Shrinkable Microlayer Film", the contents of which are hereby incorporated by references in their entirety.

As used herein, the term "opaque" may be defined in terms of one or more of total luminous transmittance, opacity, or contrast ratio opacity. Total luminous transmittance may be defined as the percentage of luminous flux that passes through a film when visible light is transmitted at the film. In some embodiments, a film is opaque if the film has a total luminous transmittance that is at or below any one of the following values: 10%, 20%, 30%, 40%, 50%, 60%, 65%, 70%, 75%, 80%, 85%, and 90%, measured in accordance with ASTM D1003. Opacity may be defined as the percentage of luminous flux that does not pass through a film when visible light is transmitted at the film. Opacity may be defined according to the formula 100%−total transmittance=opacity. In some embodiments, a film is opaque if the film has a total luminous transmittance that is at or above any one of the following values: 10%, 20%, 30%, 40%, 50%, 60%, 65%, 70%, 75%, 80%, 85%, and 90%. Contrast ratio opacity measurement characterizes how opaque a film sample is using two readings: a Y (luminance or brightness) value measured with the film sample backed by a black background and a Y value measured with the film sample backed by a white background. The resulting fraction is expressed as Y %, calculated as follows:

$$Opacity(Y) = \frac{Y_{black\ backing}}{Y_{white\ backing}} \times 100$$

In some embodiments, a film is opaque if the contrast ratio opacity for the film is at least, and/or at most, any one of the following values: 10%, 20%, 30%, 40%, 50%, 60%, 65%, 70%, 75%, 80%, 85%, and 90%, calculated per above with base values measured in accordance with ASTM D1746.

In some embodiments, the heat-shrinkable film 230 on the roll 232 is a center folded film. In other embodiments, the heat-shrinkable film 230 on roll 232 is a flat wound film. In some embodiments, the heat-shrinkable film 230 includes any sheet or film material suitable for packaging objects 236, in particular for heat-shrinkable packages 34 for use as a mailer containing an object. Suitable materials include polymers, for example thermoplastic polymers (e.g., polyethylene), that are suitable for heat sealing and/or heat shrinking. In some embodiments, the heat-shrinkable film 230 has a thickness of any of at least 3, 5, 7, 10, and 15 mils; and/or at most any of 25, 20, 16, 12, 10, 8, 6 and 5 mils. In some embodiments, the heat-shrinkable film 230 is multilayered, and has an outer layer adapted for heat sealing the heat-shrinkable film to itself to form a seal.

The transfer head 220 of the packaging system 210 receives the web of heat-shrinkable film 230 from the shrink film dispenser 218. The transfer head 220 is adapted to manage (e.g., form) the web of heat-shrinkable film 230 into a configuration for eventual sealing into a tube. In the depicted embodiment, the transfer head 220 is an inverting head 222 of continuous flow wrap that receives the web of heat-shrinkable film 230 that is center-folded from the shrink film dispenser 218 and redirects the web of film over the top and bottom inverting head arms 240, 242 to travel in a conveyance direction 238 by turning the web of film inside out. In this manner, the transfer head 220 is adapted to manage the web of film 230 to provide an interior space 244 bounded by the heat-shrinkable film 230.

In some embodiments, the transfer head 220 in the configuration of a forming box receives the lay flat web of heat-shrinkable film 230 from the shrink film dispenser 218 and redirects the web of film over the forming head to travel in the conveyance direction 238 by turning the web of heat-shrinkable film 230 inside out. In this manner, the transfer head 220 is adapted to manage the web of heat-shrinkable film 230 to provide an interior space 244 bounded by heat-shrinkable film 230.

The infeed conveyor 224 of packaging system 210 is adapted to transport a series of objects 236 and sequentially deliver them in the conveyance direction 238. In some embodiments, the infeed conveyor 224 is adapted to convey a series of objects 236. In the embodiment depicted in FIG. 3, the objects 236 have a similar size. In other embodiments, the objects 236 have varied or differing sizes. Within the series of objects 236 in sequential order, a preceding object is upstream from a following object. The infeed conveyor 224 is configured to deliver in repeating fashion a preceding object upstream from a following object into the interior space 244 of the web of heat-shrinkable film 230. In some embodiments, the objects 236 are delivered in spaced or gapped arrangement from each other.

Downstream from the infeed conveyor 224 is an object conveyor 248, which is adapted to support and transport the web of heat-shrinkable film 230 and the object 236 downstream together to the end seal mechanism 228. A first discharge conveyor 250 transports the series of packages 234 from the end seal mechanism 228.

As each object 236 of the series of objects sequentially travels through the packaging system 210, its position within the machine is tracked. This is accomplished by ways known in the art. For example, an infeed eye system (horizontal or vertical) determines the location of the front edge 252 of each object and the location of the rear edge 254 of each object as the object travels along the conveyor. This location information is communicated to a controller (i.e., a programmable logic controller or "PLC"). A system of encoders and counters, also in communication with the PLC, determines the amount of travel of the conveyor on which the object is positioned. In this manner, the position of the object 236 itself is determined and known by the PLC. The PLC is also in communication with the end seal mechanism 228 to provide the object position information for a particular object to these unit operations.

In the depicted embodiment, the longitudinal sealer 26 adapted to continuously seal the open side of the heat-shrinkable film 30 together to form a tube 56 enveloping one of the objects 236. In the depicted embodiment, the longitudinal sealer 226 is located at side of the tube 256, where the longitudinal sealer 226 forms a side seal between two edge portions of the heat-shrinkable film 230. In other embodiments, the longitudinal sealer 226 may be located beneath the tube 256, where the sealer may form, for example, a center fin seal between two edge portions of the web of the heat-shrinkable film 230. As two edge portions of the heat-shrinkable film 30 are brought together at the longitudinal sealer 226 to form the tube 256, they are sealed together, for example, by a combination of heat and pressure, to form a continuous fin or a side seal. Appropriate longitudinal sealers are known in the art, and include, for example, heat sealers.

The end seal mechanism 228 is adapted to provide or perform in repeating fashion, while the tube 256 is traveling: (i) a trailing edge seal 258 that is transverse to the tube 256 and upstream from a preceding object to create a heat-shrinkable package 234 and (ii) a leading edge seal 260 transverse to the tube 256 and downstream from a following object. Further, the end seal mechanism 228 is adapted to sever the heat-shrinkable package 234 from the tube 256 by cutting between the trailing edge seal 258 and the leading edge seal 260. Generally, the end seal mechanism 228 uses temperature and/or pressure to make two seals (trailing edge seal 258 and leading edge seal 260) and cuts between them, thus creating the final, trailing seal of one finished, preceding package and the first, leading edge seal of the following package. Advantageously, the end seal mechanism 228 may be adapted to simultaneously sever the heat-shrinkable package 234 from the tube 256 while providing the trailing edge seal 258 and leading edge seal 260.

The first discharge conveyor 250 transports the series of packages 234 from the end seal mechanism 228 to a heat shrink system 280. The heat shrink system 280 is configured to raise the temperature of the packages to cause the heat-shrinkable wrap of the packages 234 to shrink around the objects 236 to form heat-shrunk packages 234'. In some embodiments, the heat shrink system 280 is configured to subject the packages 234 to a hot fluid, such as hot air or hot water, in order to cause the heat-shrinkable wrap of the packages 234 to shrink around the objects 236. The shrink wrap system 210 further includes a second discharge conveyor 262 configured to transport the heat-shrunk packages 234' from the heat shrink system 280.

In some embodiment of form-fill-seal systems described herein, a flexible material is formed into a tube and then transversely sealed by an end seal mechanism to seal the leading and trailing edges of each package. In some embodiments, the end seal mechanism is on a moving carriage that can be moved to match the speed of the tube before the sealer engages the tube to cut and seal the tube material to form a package. This movement of the end seal carriage allows the tube to be fed at a constant rate as the packages are being formed. The constant movement of the tube allows the packages to be formed faster than if the tube had to be stopped every time that an end seal was made. An embodiment of a moving end seal carriage that is movable at the speed of the film during end seal formation is depicted in a series of instances shown in FIGS. 4A to 4F.

Figure 4A:
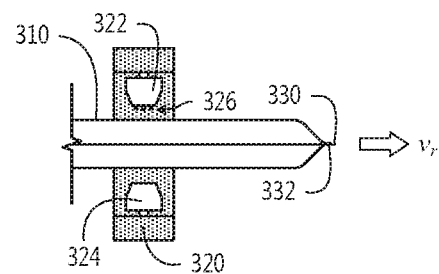
FIGS. 4A to 4F depict a series of instances of an embodiment of a moving end seal carriage that is movable at the speed of the film during end seal formation, in accordance with the embodiments disclosed herein.

FIG. 4A depicts one instance of a side view of a tube 310 of flexible material and an end seal carriage 320. In some embodiments, the flexible material is a polyethylene film, an air cellular material, a heat-shrinkable film, or any other flexible material that can be used to package an object. In some embodiments, the tube 310 is a closed tube, such as a polyethylene film that has been folded longitudinally and the longitudinal edges of the film have been longitudinally sealed. In some embodiments, the tube 310 is an open tube, such as an air cellular material that has been folded longitudinally so that the longitudinal edges are in an overlapping position.

The end seal carriage 320 holds an end seal mechanism that is capable of forming transverse seals and cuts in the tube 310 of flexible material. In the depicted embodiment, the end seal mechanism includes an upper jaw 322 and a lower jaw 324. The upper jaw 322 includes sealing and cutting elements 326 that are capable of sealing and cutting the tube 310 of flexible material. In the depicted embodiment, the sealing and cutting elements 326 includes three heating elements that extend transversely across a lower face of the upper jaw 322. The upper and lower jaws 322 and 324 can be closed to form transverse seals in the tube 310 of flexible material and to cut the tube 310 of flexible material. In the depicted embodiment, the two outer heating elements are controlled to form trailing and leading seals in the flexible material and to make a cut between the trailing and leading seals. In the instance depicted in FIG. 4A, the upper and lower jaws 322 and 324 have already formed a leading end 330 in the tube 310 and a leading seal 332.

In the instance depicted in FIG. 4A, the tube 310 is moving at a velocity $v_r$ to the right. The end seal carriage 320 is stationary so that the tube 310 is moving at the velocity $v_r$ with respect to the end seal carriage 320. The tube 310 is located between the upper and lower jaws 322 and 324 and the portion of the tube 310 that includes the leading end 330 and the leading seal 332 is to the right of the end seal carriage 320 so that the leading end 330 and the leading seal 332 are moving away from the end seal carriage 320 as the tube 310 is moving at the velocity $v_r$ to the right.

Figure 4B:
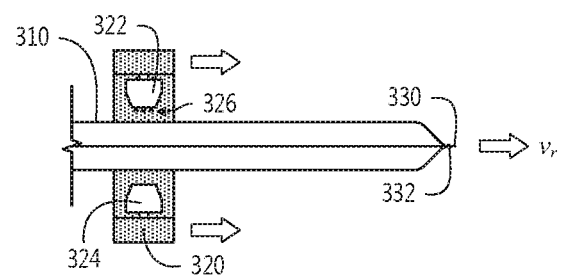

In the instance depicted in FIG. 4B, the tube 310 continues to be moved to the right at the velocity $v_r$. The end seal carriage 320 also begins to move to the right. At the instance shown in FIG. 4B, the end seal carriage 320 may not yet be moving at the velocity $v_r$, but the velocity of the end seal carriage 320 may be increasing toward the velocity $v_r$. In some embodiments, the movements of the tube 310 and the end seal carriage 320 may be controlled by one or more computing devices, such as a controller.

Figure 4C:
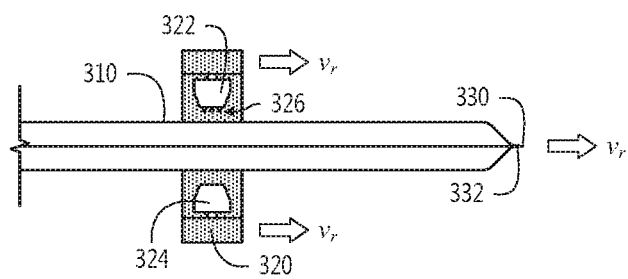

In the instance depicted in FIG. 4C, the tube 310 has reached the velocity $v_r$ as it is moving to the right. In some embodiments, the end seal carriage 320 may be controlled so that, when the end seal carriage 320 reaches the velocity $v_r$, the upper and lower jaws 322 and 324 are located at a position between objects that are inside of the tube 310. In this way, the upper and lower jaws 322 and 324 are arranged to make seals and a cut in the tube 310 between the two objects when the upper and lower jaws 322 and 324 are brought together to engage the tube 310 of flexible material.

Figure 4D:
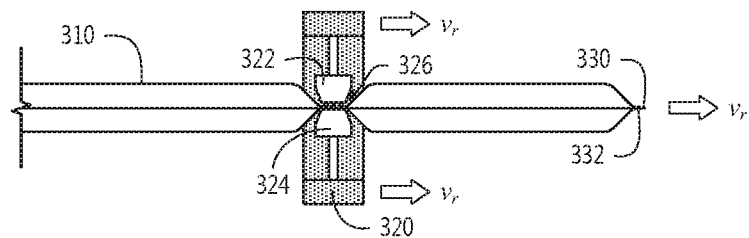

In the instance depicted in FIG. 4D, the upper and lower jaws 322 and 324 have been extended so that the upper and lower jaws 322 and 324 engage the tube 310 of flexible material. The extension of the upper and lower jaws 322 and 324 may be controlled so that the upper and lower jaws 322 and 324 exert a particular amount of force on the tube 310 of flexible material. The sealing and cutting elements 326 may also be controlled so that each of the sealing and cutting elements 326 is at a particular temperature (e.g., within a particular temperature range for sealing or cutting). The instance depicted in FIG. 4D is the beginning of a "dwell time." The dwell time in the during which the upper and lower jaws 322 and 324 are in their extended position, and the start of the dwell time in FIG. 4D is the instance when the upper and lower jaws 322 and 324 reach the extended position.

Figure 4E:
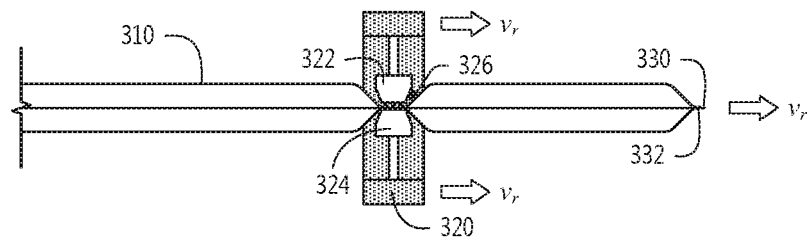

In the instance depicted in FIG. 4E, the upper and lower jaws 322 and 324 are still in the extended position and the upper and lower jaws 322 and 324 engage the tube 310 of flexible material. The instance depicted in FIG. 4E is the end of the dwell time. After this instance, the upper and lower jaws 322 and 324 are retracted back to their original position. Thus, in the depicted embodiment, the dwell time is the time between the instance depicted in FIG. 4D and the instance depicted in FIG. 4E. In the depicted embodiment, both the tube 310 and the end seal carriage 320 are moving to the right at substantially the same velocity $v_r$. The velocities of the tube 310 and the end seal carriage 320 are maintained substantially the same during the dwell time to minimize respective movements of the flexible material of the tube with respect to the sealing and cutting elements 326, thereby reducing the likelihood of distortions to the flexible material and increasing the likelihood of the proper formation of the seals and cuts made by the sealing and cutting elements 326.

Figure 4F:
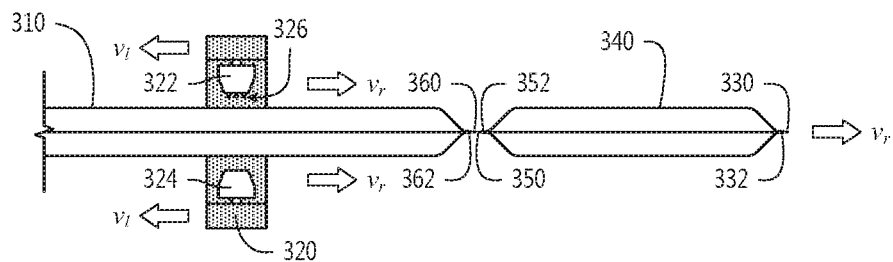

In the instance depicted in FIG. 4F, the upper and lower jaws 322 and 324 have been retracted and the end seal carriage 320 is moving to the left at a velocity $v_1$. This allows the end seal carriage 320 to return to a position where it can again engage the tube 310 of flexible material to form another set of seals and cut in the tube 310 of flexible material. FIG. 4F also depicts that the dwell time of the upper and lower jaws 322 and 324 between the instance depicted in FIG. 4D and the instance depicted in FIG. 4E resulted in the separation of a package 340 from the tube 310. More specifically, a cut was made in the flexible material to form a trailing end 350 of the package 340 and a new leading end 360 of the tube 310. The dwell time of the upper and lower jaws 322 and 324 also cause a trailing seal 352 to be formed near the trailing end 350 of the package and a leading seal 362 near the new leading end 360 of the tube 310. The package 340 and the tube 310 continue to be moved to the right at the velocity $v_r$ as the end seal carriage 320 is moving to the left at a velocity $v_1$. The movement of the package 340 to the right may be effected by conveyor belts or other transportation systems that are not depicted in FIGS. 4A to 4F for convenience.

The process shown in FIGS. 4A to 4F depicts a method of separating packages in form-fill-seal machines using a moving end seal carriage. This process allows for speed in package formation because the tube of flexible material can be fed to make consecutive packages without stopping the feeding of the flexible material to make the end seals and cuts. While this process addresses the speed of package formation, it does not always address the reliability of package formation.

One problem with the process shown in FIGS. 4A to 4F is the separation of packages from the tube of flexible material. In the instance shown in FIG. 4F, the trailing end 350 of the package 340 is in proximity to the new leading end 360 of the tube 310 at the end of the dwell time (at the time that the upper and lower jaws 322 and 324 are retracted from the tube 310). The proximity of the trailing end 350 of the package 340 is in proximity to the new leading end 360 of the tube 310 at the end of the dwell time can lead to a problem sometimes referred to as "tack back," where the trailing seal 352 and the leading seal 362 are close enough to each other before they fully cure to cause a portion the trailing seal 352 and a portion of the leading seal 362 to fuse together. When this happens, the package 340 remains coupled to the tube 310 and does not separate properly. The result is the package 340 and/or a subsequent package formed from the tube 310 are defective because they need to be physically deformed to be separated. The separation process also requires time and manual labor to separation, which may also be accompanied by the need to shut down the form-fill-seal machine.

Some ways of avoiding tack back issued have been explored. For example, some form-fill-seal machines have side conveyors downstream of the end seal to engage the sides of the package and pull the package away from the tube as soon as feasible after the end seal mechanism dwell time is complete. Side conveyors add expense and complexity to form-fill-seal machines. Side conveyors may not be arranged properly, such as if the side conveyors do not engage the packages soon enough and a tack back situation occurs before the package is pulled away from the tube. Also, side conveyors do not always work of all sized of packages formed from the tube.

Depicted in FIGS. 5A to 5F are instances of an embodiment of a process and system of end seal carriage that reliably avoids tack back. The process uses a velocity differential between the end seal carriage and the tube that starts during the dwell time to push the package away from the tube while the upper and lower jaws are in the extended position. It will be apparent that instructions for controlling the system to perform the depicted process can be stored on a computer-readable medium for execution by a computing device (e.g., one or more controllers).

Figure 5A:
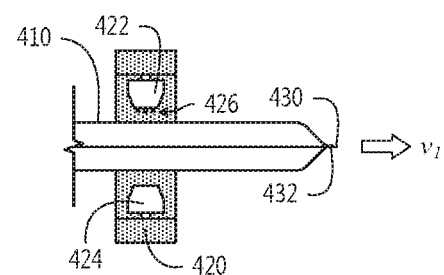
FIGS. 5A to 5F depict a series of instances of an embodiment of a moving end seal carriage that reliably avoids the issue of tack back of a package to the tube from which it was cut, in accordance with the embodiments disclosed herein.

FIG. 5A depicts one instance of a side view of a tube 410 of flexible material and an end seal carriage 420. In some embodiments, the flexible material is a polyethylene film, an air cellular material, a heat-shrinkable film, or any other flexible material that can be used to package an object. In some embodiments, air cellular material has a thickness in a range from 0.25 inches to 2 inches. In some embodiments, the tube 410 is a closed tube, such as a polyethylene film that has been folded longitudinally and the longitudinal edges of the film have been longitudinally sealed. In some embodiments, the tube 410 is an open tube, such as an air cellular material that has been folded longitudinally so that the longitudinal edges are in an overlapping position.

The end seal carriage 420 holds an end seal mechanism that is capable of forming transverse seals and cuts in the tube 410 of flexible material. In the depicted embodiment, the end seal mechanism includes an upper jaw 422 and a lower jaw 424. The upper jaw 422 includes sealing and cutting elements 426 that are capable of sealing and cutting the tube 410 of flexible material. In the depicted embodiment, the sealing and cutting elements 426 includes three heating elements that extend transversely across a lower face of the upper jaw 422. The upper and lower jaws 422 and 424 can be closed to form transverse seals in the tube 410 of flexible material and to cut the tube 410 of flexible material. In the depicted embodiment, the two outer heating elements are controlled to form trailing and leading seals in the flexible material and to make a cut between the trailing and leading seals. In the instance depicted in FIG. 5A, the upper and lower jaws 422 and 424 have already formed a leading end 430 in the tube 410 and a leading seal 432.

In the instance depicted in FIG. 5A, the tube 410 is moving at a velocity $v_1$ to the right. The end seal carriage 420 is stationary so that the tube 410 is moving at the velocity $v_1$ with respect to the end seal carriage 420. The tube 410 is located between the upper and lower jaws 422 and 424 and the portion of the tube 410 that includes the leading end 430 and the leading seal 432 is to the right of the end seal carriage 420 so that the leading end 430 and the leading seal 432 are moving away from the end seal carriage 420 as the tube 410 is moving at the velocity $v_1$ to the right.

Figure 5B:
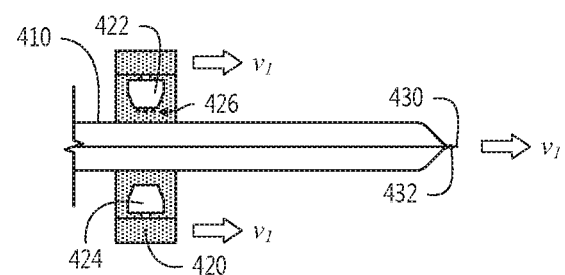

In the instance depicted in FIG. 5B, the tube 410 continues to be moved to the right at the velocity $v_1$. The end seal carriage 420 also begins to move to the right. At the instance shown in FIG. 5B, the end seal carriage 420 may not yet be moving at the velocity $v_1$, but the velocity of the end seal carriage 420 may be increasing toward the velocity $v_1$. In some embodiments, the movements of the tube 410 and the end seal carriage 420 may be controlled by one or more computing devices, such as a controller.

Figure 5C:
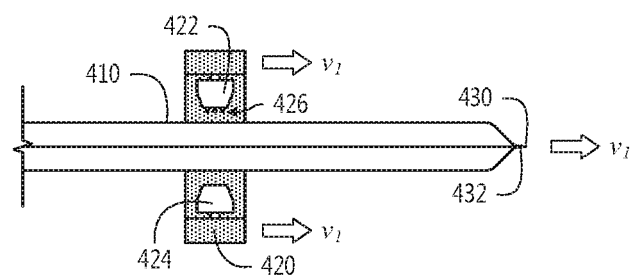

In the instance depicted in FIG. 5C, the tube 410 has reached the velocity $v_1$ as it is moving to the right. In some embodiments, the end seal carriage 420 may be controlled so that, when the end seal carriage 420 reaches the velocity $v_1$, the upper and lower jaws 422 and 424 are located at a position between objects that are inside of the tube 410. In this way, the upper and lower jaws 422 and 424 are arranged to make seals and a cut in the tube 410 between the two objects when the upper and lower jaws 422 and 424 are brought together to engage the tube 410 of flexible material.

Figure 5D:
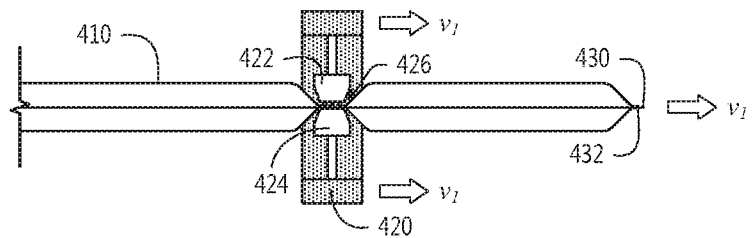

In the instance depicted in FIG. 5D, the upper and lower jaws 422 and 424 have been extended so that the upper and lower jaws 422 and 424 engage the tube 410 of flexible material. The extension of the upper and lower jaws 422 and 424 may be controlled so that the upper and lower jaws 422 and 424 exert a particular amount of force (e.g., within a particular range of force) on the tube 410 of flexible material. The sealing and cutting elements 426 may also be controlled so that each of the sealing and cutting elements 426 is at a particular temperature (e.g., within a particular temperature range for sealing or cutting). The instance depicted in FIG. 5D is the beginning of the dwell time during which the upper and lower jaws 422 and 424 are in their extended position. The start of the dwell time in FIG. 5D is the instance when the upper and lower jaws 422 and 424 reach the extended position.

Figure 5E:
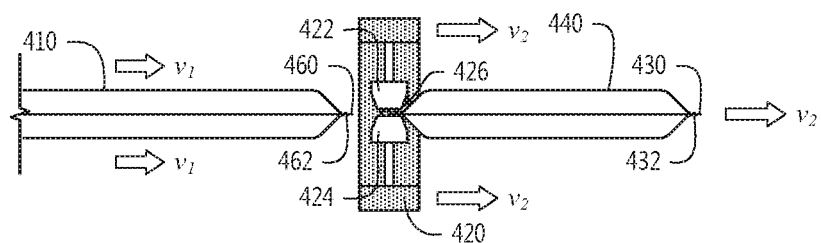

In the instance depicted in FIG. 5E, the upper and lower jaws 422 and 424 are still in the extended position. At some point during the dwell time, the velocity of the end seal carriage 420 has been changed so there is a velocity differential between the end seal carriage 420 and the tube 410. In particular, at the instance shown in FIG. 5E, the end seal carriage 420 is moving at a velocity $v_2$ to the right while the tube 410 continues to be fed so that it moves at the velocity $v_1$. In the depicted embodiment, the velocity $v_2$ is greater than the velocity $v_1$ so that the end seal carriage 420 has pulled away from the tube 410. At that instant, a package 440 has been separated from the tube 410 and the package is being moved at the velocity $v_2$ by the upper and lower jaws 422 and 424 and the package 440 has also been pulled away from the tube 410. The sealing and cutting elements 426 have formed a cut between the tube 410 and the package so that a new leading end 460 of the package is formed. The sealing and cutting elements 426 have also formed a leading seal 462 near the new leading end 460 of the tube 410.

The upper and lower jaws 422 and 424 remain in contact with the package 440 in the instance shown in FIG. 5E, while the upper and lower jaws 422 and 424 are no longer in contact with the tube 410 because the end seal carriage 420 has pulled away from the tube 410. The instance depicted in FIG. 5E is the end of the dwell time. After this instance, the upper and lower jaws 422 and 424 are retracted back to their original position. Thus, in the depicted embodiment, the dwell time is the time between the instance depicted in FIG. 5D and the instance depicted in FIG. 5E. It would appear from this process that the velocity differential of the end seal carriage 420 with respect to the tube 410 would be problematic because the upper and lower jaws 422 and 424 do not remain in contact with the tube 410 for the entire dwell period. It may be expected that the upper and lower jaws 422 and 424 would damage the new leading end 460 of the tube 410 or that the leading seal 462 may not be formed properly as the upper and lower jaws 422 and 424 are in the extended position when they are pulled away from the tube 410. However, using the velocity differential methods resulted in positive characteristics of both the aesthetic appearance of the new leading end 460 of the tube 410 and the integrity of the leading seal 462. In addition, the frequency of tack back issues was reduced significantly because the distance between the new leading end 460 of the tube 410 and the package 440 was much greater at the end of the dwell time.

Figure 5F:
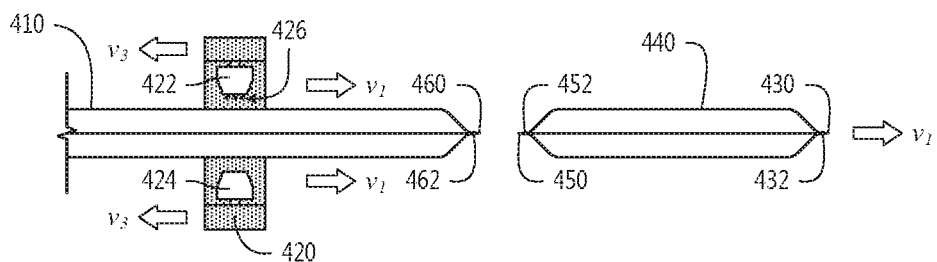

In the instance depicted in FIG. 5F, the upper and lower jaws 422 and 424 have been retracted and the end seal carriage 420 is moving to the left at a velocity $v_3$. This allows the end seal carriage 420 to return to a position where it can again engage the tube 410 of flexible material to form another set of seals and cut in the tube 410 of flexible material. FIG. 5F also depicts that the dwell time of the upper and lower jaws 422 and 424 between the instance depicted in FIG. 5D and the instance depicted in FIG. 5E resulted in greater separation of a package 440 from the tube 410. A trailing end 450 of the package 340 was formed by the upper and lower jaws 422 and 424, and a trailing seal 452 was formed near the trailing end 450 of the package 440. In the depicted embodiment, the package 440 has been slowed down to the velocity $v_1$ as the end seal carriage 420 is moving to the left at the velocity $v_3$. It will be apparent the package 440 could be moving at any other velocity at this instance. The movement of the package 440 to the right at the instance shown in FIG. 5F may be effected by conveyor belts or other transportation systems that are not depicted for convenience.

Figure 6:
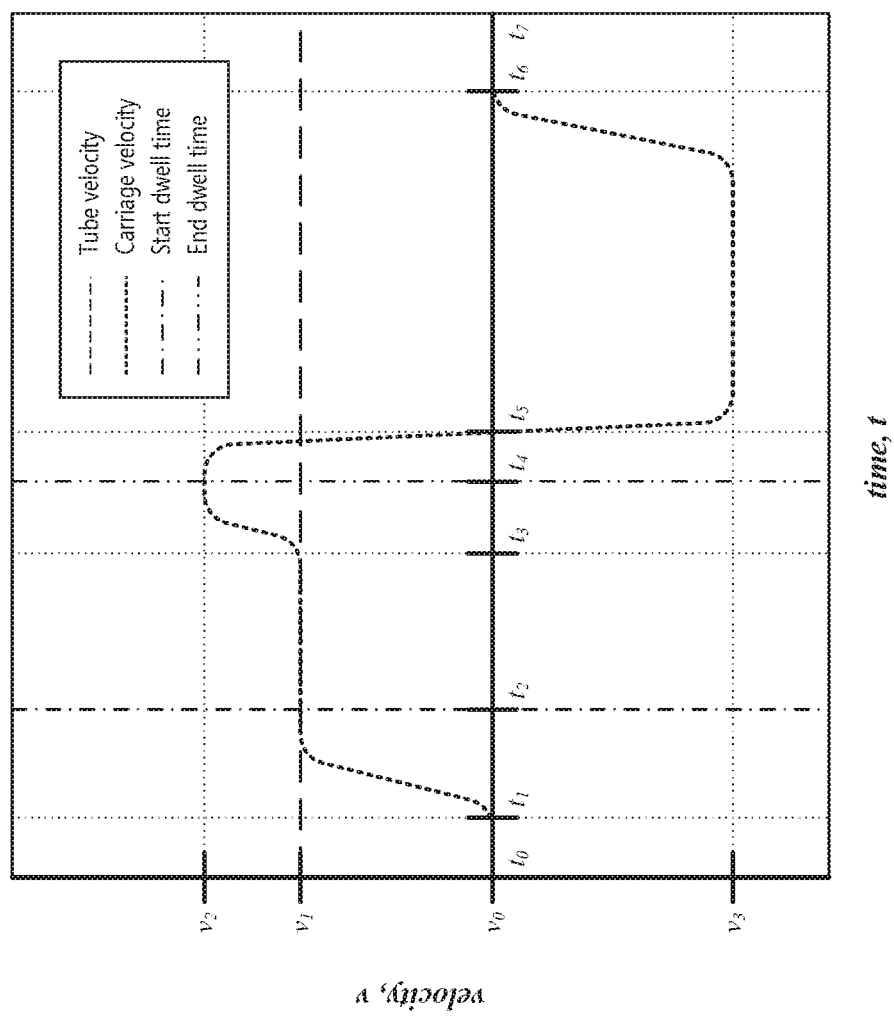
FIG. 6 depicts a chart showing the velocities overtime of embodiments of a tube of flexible material and an end seal carriage, in accordance with the embodiments disclosed herein.

Depicted in FIG. 6 is a chart showing the velocities over time of embodiments of a tube of flexible material and an end seal carriage. More specifically, the chart in FIG. 6 shows the velocity of the tube of flexible material over using a long-long dashed line and the velocity of the end seal carriage over using a short-short dashed line. The end seal carriage includes an end seal mechanism that is capable of forming a cut and/or seals in the tube of flexible material during a dwell time of the end seal mechanism. The chart shows the start of a dwell time using a dash-dot-dash line and the end of the dwell time using a dash-dot-dot-dash line.

In the depicted embodiment, the tube of flexible material is fed at velocity $v_1$ from time $t_0$ until time $t_7$. Thus, the tube of flexible material is fed at a substantially constant velocity over the time depicted in the chart in FIG. 6. The end seal carriage is initially (i.e., at time $t_0$) not moving (i.e., at velocity $v_0$). At time $t_1$, the velocity of the end seal carriage begins to increase from velocity $v_0$ toward velocity $v_1$. The time $t_1$ may be determined (e.g., by a computing device, such as a controller) so that, when the end seal carriage reaches velocity $v_1$, the end seal carriage located with respect to the tube where a cut and seals are to be made in the tube. As can be seen in the chart, the end seal carriage reaches velocity $v_1$ before time $t_2$.

At time $t_2$, the dwell time of the end seal mechanism starts. In some embodiments, the end seal mechanism is movable between a retracted position where the end seal mechanism is not in contact with the tube and an extended position where the end seal mechanism is in contact with the tube. In these embodiments, the start of the dwell time may be the instant that the end seal mechanism reaches the extended position. In the depicted embodiment, the dwell time ends at time $t_4$. Thus, the dwell time in between time $t_2$ and time $t_4$. In some embodiments, the dwell time ends at the time that the end seal mechanism is retracted from the extended position.

In the depicted embodiment, the end seal carriage and the tube are moving at substantially the same velocity (velocity $v_1$) in substantially the same direction when the dwell time starts. For a first portion of the dwell time, the end seal carriage continues to move at velocity $v_1$. At time $t_3$ during the dwell time, the velocity of the end seal carriage begins to increase toward velocity $v_2$. The velocity of the tube remains substantially constant at velocity $v_1$ at the time $t_3$ so that a velocity differential is created between the tube and the end seal carriage. Because the velocity of the end seal carriage increases from the time $t_3$, the velocity differential in the depicted embodiment causes separation of a package, which has been cut from the tube by the end seal mechanism, from the tube. In the depicted embodiment, the end of the dwell time at time $t_4$ occurs when the velocity of the end seal carriage is at velocity $v_2$. However, it is apparent that the same benefits could be achieved if the end of the dwell time occurred either before or after the end seal carriage is at velocity $v_2$.

After time $t_4$, the velocity of the end seal carriage decreases. In some embodiments, the end seal mechanism is fully retracted before the velocity of the end seal carriage reaches velocity $v_1$. The velocity of the end seal carriage decreases until the velocity of the end seal carriage reaches velocity $v_3$. At time $t_5$, the velocity of the end seal carriage passes velocity $v_0$, at which time the direction of movement of the end seal carriage reverses. After time $t_5$, the end seal carriage is moving in the opposite direction of the tube. In some embodiments, the end seal carriage continues moving at velocity $v_3$ for a period of time and then slows back to velocity $v_0$ at time $t_6$. The end seal carriage can then remain stationary until time $t_7$, at which point the process shown in FIG. 6 can be repeated. In some embodiments, the time that the end seal carriage moves at velocity $v_3$ and/or the magnitude of velocity $v_3$ is controlled so that the position of the end seal carriage at time $t_7$ is substantially the same as the position where the end seal carriage was at time $t_0$.

Figure 7:
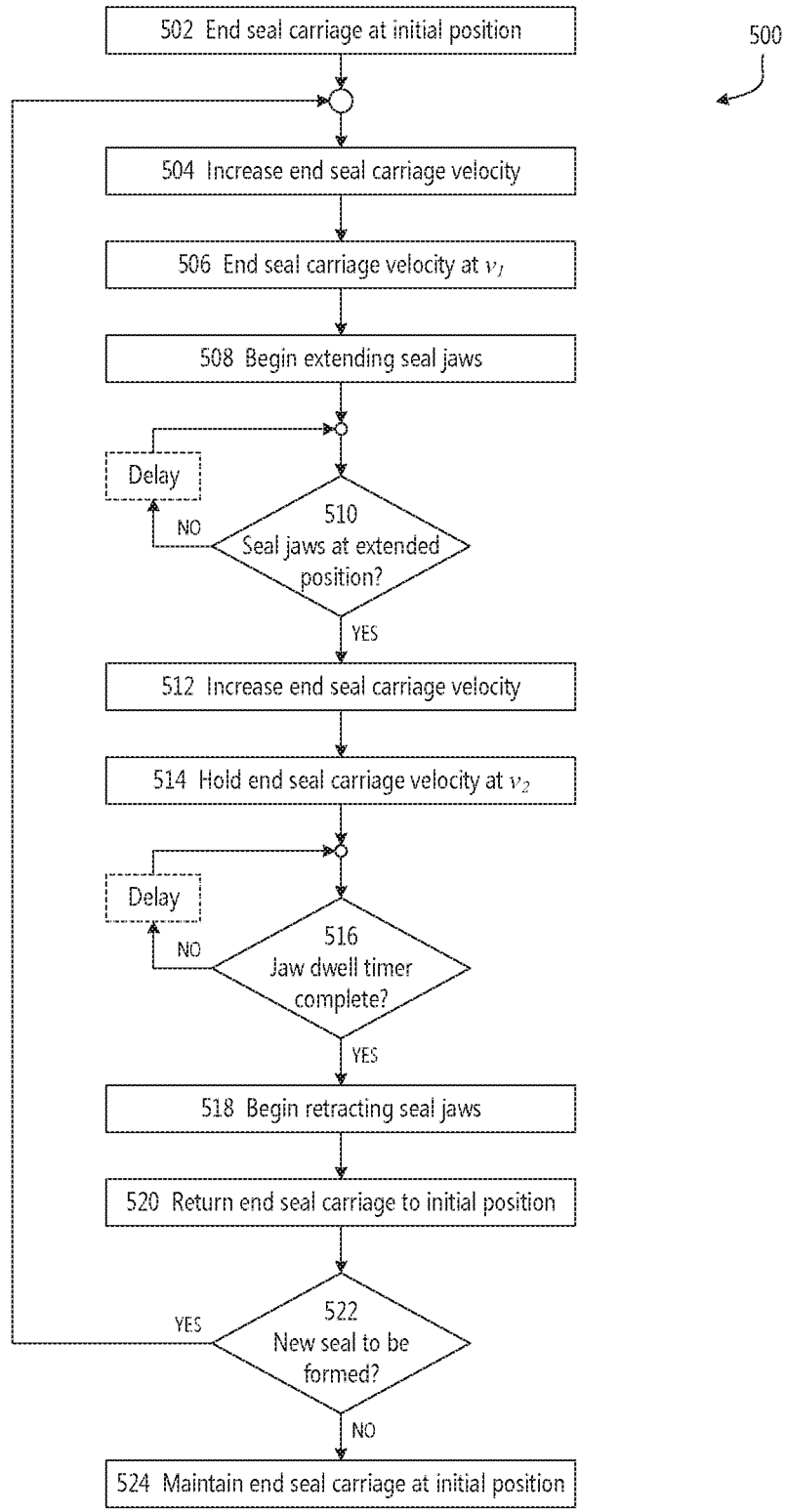
FIG. 7 depicts another embodiment of a method 500 of controlling an end seal carriage to reliably avoid tack back, in accordance with the embodiments disclosed herein.

FIG. 7 depicts another embodiment of a method 500 of controlling an end seal carriage to reliably avoid tack back. In some embodiments, the method 500 is performed by a computing device, such as a controller, that controls components of a form-fill-seal system, such as the position and speed of the end seal carriage, the position of an end seal mechanism on the end seal carriage, a speed at which a tube feeding system feeds the tube of flexible material, or any other component.

At block 502, the end seal carriage starts at an initial position. The initial position may be as far upstream of the tube of flexible material as the end seal carriage is capable of being positioned. In some embodiments, when the end seal carriage is at the initial position at block 502, the end seal carriage is at rest (e.g., not moving with respect to the form-fill-seal system). At block 504, the velocity of the end seal carriage is increased. In some embodiments, the increase in the end seal carriage velocity is in substantially the same direction as the movement of the tube of flexible material at a velocity $v_1$. At block 506, the end seal carriage reaches the velocity $v_1$. In some embodiments, the end seal carriage and the tube of flexible material are moving at substantially the same velocities when the end seal carriage reaches the velocity $v_1$.

At block 508, the seal jaws of the seal mechanism begin to extend. In this embodiment of the method 500, the end seal mechanism is a pair of seal jaws that can be extended to engage the tube of flexible material and retracted to be withdrawn from the tube of flexible material. In other embodiments of the method, the end seal mechanism can be any other type of mechanism that selectively engages the tube of flexible material to cut and seal the flexible material. In some embodiments, the beginning of extending the jaws at block 508 occurs immediately after the end seal carriage reaches the velocity $v_1$ at block 506, after some delay following the end seal carriage reaching the velocity $v_1$ at block 506, or before the end seal carriage reaches the velocity $v_1$ at block 506.

After the seal jaws begin extending at block 508, the method 500 proceeds to block 510 where a decision is made whether the seal jaws are at the extended position. If, at block 510, the seal jaws have not yet reached the extended position, then the method loops back again to block 510 to make the same determination again. In some embodiments, as shown in dashed lines in FIG. 7, a delay can be optionally introduced on the loop back line so that the decision at block 510 will not be repeated until after the delay elapses. In some embodiments, the delay is in a range from one microsecond to one second. This delay may allow for sufficient time to pass for the seal jaws to reach the extended position before the method 500 loops back to block 510. If, at block 510, a determination is made that the seal jaws have reached the extended position, then the method proceeds to block 512.

At block 512, the velocity of the end seal carriage increases from velocity $v_1$. In the depicted embodiment, the velocity continues to increase from the point at block 512 until the velocity of the end seal carriage reaches velocity $v_2$ and is held at the velocity $v_2$ at block 514. In some embodiments, the determination that the seal jaws are at the extended position at block 510 occurs before the increase of the end seal carriage velocity at block 512 (as shown in the depicted embodiment), after the increase of the end seal carriage velocity at block 512 but before the end seal carriage reaches velocity $v_2$ at block 514, or after the end seal carriage reaches velocity $v_2$ at block 514.

After the seal carriage reaches velocity $v_2$ at block 514, the method 500 proceeds to block 516 where a decision is made whether the jaw dwell timer is complete. If, at block 516, the jaw dwell timer is not yet complete, then the method loops back again to block 516 to make the same determination again. In some embodiments, as shown in dashed lines in FIG. 7, a delay can be optionally introduced on the loop back line so that the decision at block 516 will not be repeated until after the delay elapses. In some embodiments, the delay is in a range from one microsecond to one second. This delay may allow for sufficient time to pass for the jaw dwell timer to be completed before the method 500 loops back to block 516. If, at block 516, a determination is made that the seal jaws have reached the extended position, then the method proceeds to block 518.

At block 518, the seal jaws begin to retract. The method 500 then proceeds to block 520 where the end seal carriage is returned to its initial position. In some embodiments, the seal jaws fully retract before the end seal carriage is slowed from velocity $v_2$ to return to the initial position. In some embodiments, the seal jaws are in the process of retracting as the end seal carriage begins to slow from velocity $v_2$ to begin returning to the initial position. In some embodiments, the end seal carriage begins to slow from velocity $v_2$ to begin returning to the initial position before the seal jaws begin to retract at block 518. In some embodiments, the beginning of retracting the jaws at block 518 occurs after the jaw dwell timer is determined to be complete at block 516 (as shown in the depicted embodiment), after some delay following the determination that the jaw dwell timer is complete at block 516, or before the jaw dwell timer is determined to be complete at block 516.

After the end seal carriage is returned to its initial position at block 520, the method proceeds to block 522 where a determination is made whether a new seal is to be formed in the tube of flexible material. If, at block 522, a decision is made that a new seal is not to be formed, then, the method 500 proceeds to block 524 where the end seal carriage is maintained at the initial position. However, if, at block 522, a decision is made that a new seal is to be formed, then, the method 500 returns to block 504 where the velocity of the end seal carriage begins to increase. In some embodiments a computing device, such as a controller, may control the timing of when the velocity of the end seal carriage begins to increase at block 504 based on a desired location of a seal in the tube of flexible material.

Figure 8:
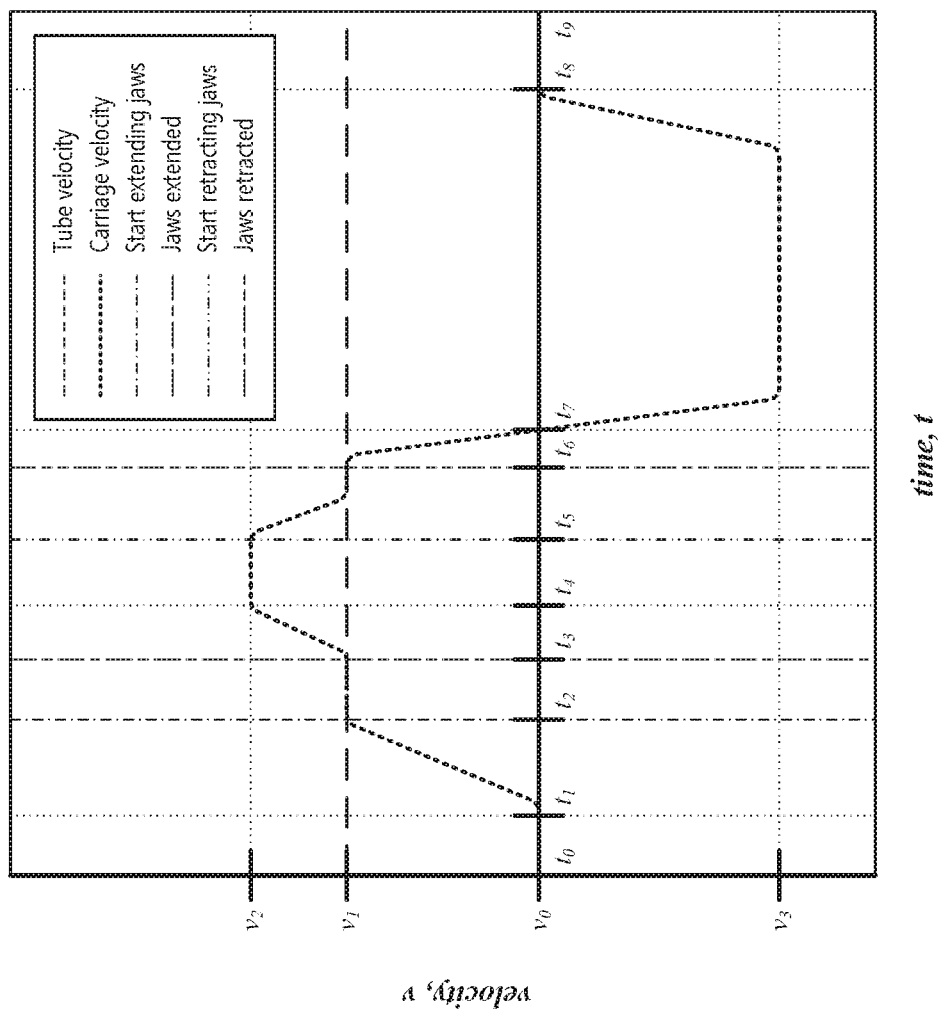
FIG. 8 depicts a chart showing the velocities over time of embodiments of a tube of flexible material and an end seal carriage, in accordance with the embodiments disclosed herein.

Depicted in FIG. 8 is a chart showing the velocities over time of embodiments of a tube of flexible material and an end seal carriage. More specifically, the chart in FIG. 6 shows the velocity of the tube of flexible material over using a long-long dashed line and the velocity of the end seal carriage over using a short-short dashed line. The end seal carriage includes an end seal mechanism in the form of seal jaws that are capable of forming a cut and/or seals in the tube of flexible material when the seal jaws are extended to engage the tube of flexible material. The chart shows a time when the seal jaws start extending using a dash-dot-dash line, a time when the seal jaws reach an extended position using a long-short-long dashed line, a time when the seal jaws start retracting using a dash-dot-dot-dash line, and a time when the seal jaws reach a retracted position using a long-short-short-long dashed line.

In the depicted embodiment, the tube of flexible material is fed at velocity $v_1$ from time $t_0$ until time $t_9$. Thus, the tube of flexible material is fed at a substantially constant velocity over the time depicted in the chart in FIG. 8. The end seal carriage is initially (i.e., at time $t_0$) not moving (i.e., at velocity $v_0$). At time $t_1$, the velocity of the end seal carriage begins to increase from velocity $v_0$ toward velocity $v_1$. The time $t_1$ may be determined (e.g., by a computing device, such as a controller) so that, when the end seal carriage reaches velocity $v_1$, the end seal carriage is located with respect to the tube where a cut and seals are to be made in the tube. As can be seen in the chart, the end seal carriage reaches velocity $v_1$ at time $t_2$.

At time $t_2$, the seal jaws begin to extend from a retracted position. In the depicted embodiment, the seal jaws begin to extend at the time that the end seal carriage reaches velocity $v_1$. In other embodiments, the seal jaws may begin to extend at a time that is either before or after the time that the end seal carriage reaches velocity $v_1$. After the velocity of the seal jaw begins to increase from velocity $v_1$, the seal jaws continue to extend until they reach the extended position. In the depicted embodiment, the seal jaws reach the extended position at time $t_3$. At time $t_3$, when the seal jaws are in the extended position, the velocity of the end seal carriage begins to increase from velocity $v_1$ toward velocity $v_2$. In the depicted embodiment, the velocity of the end seal carriage begins to increase from velocity $v_1$ at the time that the seal jaws reach the extended position. In other embodiments, the velocity of the end seal carriage begins to increase from velocity $v_1$ at a time that is either before or after the time that the seal jaws reach the extended position.

In the depicted embodiment, the end seal carriage and the tube are moving at substantially the same velocity (velocity $v_1$) in substantially the same direction when the seal jaws are extending. At time $t_3$, the velocity of the end seal carriage begins to increase toward velocity $v_2$. The velocity of the tube remains substantially constant at velocity $v_1$ at the time $t_3$ so that a velocity differential is created between the tube and the end seal carriage. Because the velocity of the end seal carriage increases from the time $t_3$, the velocity differential in the depicted embodiment causes separation of a package, which has been cut from the tube by the seal jaws. At time $t_4$, the velocity of the end seal carriage reaches velocity $v_2$. From time $t_4$ until time $t_5$, the velocity of the end seal carriage remains substantially constant at velocity $v_2$. In some embodiments, during the time between time $t_4$ and time $t_5$, a computing device that controls movements of the ends seal carriage may be in a loop to determine whether a dwell timer has been completed (e.g., the loop shown at block 516 in FIG. 7).

At time $t_2$, the seal jaws begin to retract from the extended position. In the depicted embodiment, the seal jaws begin to retract at the time that the end seal carriage begins to slow from velocity $v_2$. In other embodiments, the seal jaws may begin to retract at a time that is either before or after the time that the end seal carriage begins to slow from velocity $v_2$. After the velocity of the seal jaw begins to decrease from velocity $v_2$, the seal jaws continue to retract until they reach the retracted position. In the depicted embodiment, the seal jaws reach the retracted position at time $t_6$. At time $t_6$, when the seal jaws are in the retracted position, the velocity of the end seal carriage has been reduced to from velocity $v_2$ to velocity $v_1$. In the depicted embodiment, the velocity of the end seal carriage begins to decrease from velocity $v_2$ at the time that the seal jaws begin to retract from the extended position. In other embodiments, the velocity of the end seal carriage begins to decrease from velocity $v_2$ at a time that is either before or after the time that the seal jaws begin to retract from the extended position.

The time that is considered the dwell time of the seal jaws in FIG. 7 may be a number of different time intervals. In some embodiments, the dwell time may be the time between time $t_3$ and time $t_5$ when the seal jaws are in the extended position. In some embodiments, the dwell time may be the time between time $t_2$ and time $t_6$ when the seal jaws are not in the retracted position. In some embodiments, the dwell time may be the time between time $t_2$ and time $t_5$ between the time that the seal jaws begin extending form the retracted position and the time that the seal jaws begin retracting from the extended position. In some embodiments, the dwell time may be the time between time $t_3$ and time $t_6$ between the time that the seal jaws reach the extended position and the time that the seal jaws reach the retracted position. In the embodiments where a dwell timer is used, the dwell timer may be based on any of these embodiments of the dwell time.

After time $t_6$, the velocity of the end seal carriage is further decreased. In the depicted embodiment, the velocity of the end seal carriage decreases until the velocity of the end seal carriage reaches velocity $v_3$. At time $t_7$, the velocity of the end seal carriage passes velocity $v_0$, at which time the direction of movement of the end seal carriage reverses. After time $t_7$, the end seal carriage is moving in the opposite direction of the tube. In some embodiments, the end seal carriage continues moving at velocity $v_3$ for a period of time and then slows back to velocity $v_0$ at time $t_8$. The end seal carriage can then remain stationary until time $t_9$, at which point the process shown in FIG. 8 can be repeated. In some embodiments, the time that the end seal carriage moves at velocity $v_3$ and/or the magnitude of velocity $v_3$ is controlled so that the position of the end seal carriage at time $t_9$ is substantially the same as the position where the end seal carriage was at time $t_0$.

FIG. 9 depicts an example embodiment of a system 610 that may be used to implement some or all of the embodiments described herein. In the depicted embodiment, the system 610 includes computing devices $620_1$, $620_2$, $620_3$, and $620_4$ (collectively computing devices 620). In the depicted embodiment, the computing device $620_1$ is a tablet, the computing device $620_2$ is a mobile phone, the computing device $620_3$ is a desktop computer, and the computing device $620_4$ is a laptop computer. In other embodiments, the computing devices 620 include one or more of a desktop computer, a mobile phone, a tablet, a phablet, a notebook computer, a laptop computer, a distributed system, a gaming console (e.g., Xbox, Play Station, Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof.

The computing devices 620 are communicatively coupled to each other via one or more networks 630 and 632. Each of the networks 630 and 632 may include one or more wired or wireless networks (e.g., a 3G network, the Internet, an internal network, a proprietary network, a secured network). The computing devices 620 are capable of communicating with each other and/or any other computing devices via one or more wired or wireless networks. While the particular system 610 in FIG. 9 depicts that the computing devices 620 communicatively coupled via the network 630 include four computing devices, any number of computing devices may be communicatively coupled via the network 630.

In the depicted embodiment, the computing device $620_3$ is communicatively coupled with a peripheral device 640 via the network 632. In the depicted embodiment, the peripheral device 640 is a scanner, such as a barcode scanner, an optical scanner, a computer vision device, and the like. In some embodiments, the network 632 is a wired network (e.g., a direct wired connection between the peripheral device 640 and the computing device $620_3$), a wireless network (e.g., a Bluetooth connection or a WiFi connection), or a combination of wired and wireless networks (e.g., a Bluetooth connection between the peripheral device 640 and a cradle of the peripheral device 640 and a wired connection between the peripheral device 640 and the computing device $620_3$). In some embodiments, the peripheral device 640 is itself a computing device (sometimes called a "smart" device). In other embodiments, the peripheral device 640 is not a computing device (sometimes called a "dumb" device).

Depicted in FIG. 10 is a block diagram of an embodiment of a computing device 700. Any of the computing devices 620 and/or any other computing device described herein may include some or all of the components and features of the computing device 700. In some embodiments, the computing device 700 is one or more of a desktop computer, a mobile phone, a tablet, a phablet, a notebook computer, a laptop computer, a distributed system, a gaming console (e.g., an Xbox, a Play Station, a Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

In the depicted embodiment, the computing device 600 includes a processing element 705, memory 710, a user interface 715, and a communications interface 720. The processing element 705, memory 710, a user interface 715, and a communications interface 720 are capable of communicating via a communication bus 725 by reading data from and/or writing data to the communication bus 725. The computing device 700 may include other components that are capable of communicating via the communication bus 725. In other embodiments, the computing device does not include the communication bus 725 and the components of the computing device 700 are capable of communicating with each other in some other way.

The processing element 705 (also referred to as one or more processors, processing circuitry, and/or similar terms used herein) is capable of performing operations on some external data source. For example, the processing element may perform operations on data in the memory 710, data receives via the user interface 715, and/or data received via the communications interface 720. As will be understood, the processing element 705 may be embodied in a number of different ways. In some embodiments, the processing element 705 includes one or more complex programmable logic devices (CPLDs), microprocessors, multi-core processors, co processing entities, application-specific instruction-set processors (ASIPs), microcontrollers, controllers, integrated circuits, application specific integrated circuits (ASICs), field programmable gate arrays (FPGAs), programmable logic arrays (PLAs), hardware accelerators, any other circuitry, or any combination thereof. The term circuitry may refer to an entirely hardware embodiment or a combination of hardware and computer program products. In some embodiments, the processing element 605 is configured for a particular use or configured to execute instructions stored in volatile or nonvolatile media or otherwise accessible to the processing element 705. As such, whether configured by hardware or computer program products, or by a combination thereof, the processing element 705 may be capable of performing steps or operations when configured accordingly.

The memory 710 in the computing device 700 is configured to store data, computer-executable instructions, and/or any other information. In some embodiments, the memory 710 includes volatile memory (also referred to as volatile storage, volatile media, volatile memory circuitry, and the like), non-volatile memory (also referred to as non-volatile storage, non-volatile media, non-volatile memory circuitry, and the like), or some combination thereof.

In some embodiments, volatile memory includes one or more of random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, any other memory that requires power to store information, or any combination thereof.

In some embodiments, non-volatile memory includes one or more of hard disks, floppy disks, flexible disks, solid-state storage (SSS) (e.g., a solid state drive (SSD)), solid state cards (SSC), solid state modules (SSM), enterprise flash drives, magnetic tapes, any other non-transitory magnetic media, compact disc read only memory (CD ROM), compact disc-rewritable (CD-RW), digital versatile disc (DVD), Blu-ray disc (BD), any other non-transitory optical media, read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, Memory Sticks, conductive-bridging random access memory (CBRAM), phase-change random access memory (PRAM), ferroelectric random-access memory (FeRAM), non-volatile random access memory (NVRAM), magneto-resistive random access memory (MRAM), resistive random-access memory (RRAM), Silicon Oxide-Nitride-Oxide-Silicon memory (SONOS), floating junction gate random access memory (FJG RAM), Millipede memory, racetrack memory, any other memory that does not require power to store information, or any combination thereof.

In some embodiments, memory 710 is capable of storing one or more of databases, database instances, database management systems, data, applications, programs, program modules, scripts, source code, object code, byte code, compiled code, interpreted code, machine code, executable instructions, or any other information. The term database, database instance, database management system, and/or similar terms used herein may refer to a collection of records or data that is stored in a computer-readable storage medium using one or more database models, such as a hierarchical database model, network model, relational model, entity relationship model, object model, document model, semantic model, graph model, or any other model.

The user interface 715 of the computing device 700 is in communication with one or more input or output devices that are capable of receiving inputs into and/or outputting any outputs from the computing device 700. Embodiments of input devices include a keyboard, a mouse, a touchscreen display, a touch sensitive pad, a motion input device, movement input device, an audio input, a pointing device input, a joystick input, a keypad input, peripheral device 640, foot switch, and the like. Embodiments of output devices include an audio output device, a video output, a display device, a motion output device, a movement output device, a printing device, and the like. In some embodiments, the user interface 715 includes hardware that is configured to communicate with one or more input devices and/or output devices via wired and/or wireless connections.

The communications interface 720 is capable of communicating with various computing devices and/or networks. In some embodiments, the communications interface 720 is capable of communicating data, content, and/or any other information, that can be transmitted, received, operated on, processed, displayed, stored, and the like. Communication via the communications interface 620 may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, communication via the communications interface 720 may be executed using a wireless data transmission protocol, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (WiFi), WiFi Direct, 802.16 (WiMAX), ultra wideband (UWB), infrared (IR) protocols, near field communication (NFC) protocols, Wibree, Bluetooth protocols, wireless universal serial bus (USB) protocols, or any other wireless protocol.

As will be appreciated by those skilled in the art, one or more components of the computing device 700 may be located remotely from other components of the computing device 700 components, such as in a distributed system. Furthermore, one or more of the components may be combined and additional components performing functions described herein may be included in the computing device 700. Thus, the computing device 700 can be adapted to accommodate a variety of needs and circumstances. The depicted and described architectures and descriptions are provided for exemplary purposes only and are not limiting to the various embodiments described herein.

Embodiments described herein may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

As should be appreciated, various embodiments of the embodiments described herein may also be implemented as methods, apparatus, systems, computing devices, and the like. As such, embodiments described herein may take the form of an apparatus, system, computing device, and the like executing instructions stored on a computer readable storage medium to perform certain steps or operations. Thus, embodiments described herein may be implemented entirely in hardware, entirely in a computer program product, or in an embodiment that comprises combination of computer program products and hardware performing certain steps or operations.

Embodiments described herein may be made with reference to block diagrams and flowchart illustrations. Thus, it should be understood that blocks of a block diagram and flowchart illustrations may be implemented in the form of a computer program product, in an entirely hardware embodiment, in a combination of hardware and computer program products, or in apparatus, systems, computing devices, and the like carrying out instructions, operations, or steps. Such instructions, operations, or steps may be stored on a computer readable storage medium for execution buy a processing element in a computing device. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A method comprising:
   feeding a tube of flexible material at a first velocity through a portion of a form-fill-seal system, wherein the form-fill-seal system includes a movable end seal carriage that includes an end seal mechanism;
   increasing a velocity of the end seal carriage to substantially the first velocity;
   starting a dwell time of the end seal mechanism on the tube of flexible material while the velocity of the end seal carriage is at substantially the first velocity, wherein the end seal mechanism is configured to cut a package from the tube during the dwell time; and increasing the velocity of the end seal carriage to a second velocity during the dwell time, wherein increasing the velocity of the end seal carriage results in an increased distance of the package from the tube.

2. The method of claim 1, wherein the end seal mechanism is in contact with the tube and in contact with the package during a first portion of the dwell time when the velocity of the end seal carriage is at substantially the first velocity.

3. The method of claim 2, wherein the end seal mechanism is no longer in contact with the tube and remains in contact with the package during a second portion of the dwell time when the velocity of the end seal carriage is at the second velocity.

4. The method of claim 2, further comprising:
cutting, by the end seal mechanism, the package from the tube to form a trailing end of the package and a leading end of the tube during the first portion of the dwell time.

5. The method of claim 4, further comprising:
forming, by the end seal mechanism, a leading seal in the tube near the leading end of the tube during the first portion of the dwell time.

6. The method of claim 4, further comprising:
forming, by the end seal mechanism, a trailing seal in the package near the trailing end of the tube during the first portion of the dwell time.

7. The method of claim 1, wherein the end seal mechanism includes an upper jaw and a lower jaw.

8. The method of claim 7, further comprising:
extending the upper and lower jaws into an extended position at which the upper and lower jaws contact the tube.

9. The method of claim 8, wherein the velocity of the end seal carriage is increased to the second velocity after the upper and lower jaws reach the extended position.

10. The method of claim 8, further comprising:
ending the dwell time while the velocity of the end seal carriage is greater than the first velocity, wherein ending the dwell time includes retracting the upper and lower jaws from the extended position until the upper and lower jaws are no longer in contact with the package.

11. The method of claim 1, wherein the flexible material includes one or more of a polyethylene film, an air cellular material, or a heat-shrinkable film.

12. The method of claim 1, wherein the tube is an open tube of an air cellular material that has been folded longitudinally so that longitudinal edges of the air cellular material are in an overlapping position.

13. A system comprising:
a tube feeding system configured to feed a tube of flexible material at a first velocity;
an end seal carriage configured to be moved with respect to the tube of flexible material, the end seal carriage including an end seal mechanism; and
a computing device configured to control the end seal carriage to cause:
an increase in a velocity of the end seal carriage to substantially the first velocity;
a start of a dwell time of the end seal mechanism on the tube of flexible material while the velocity of the end seal carriage is at substantially the first velocity, wherein the end seal mechanism is configured to cut a package from the tube during the dwell time; and
an increase in the velocity of the end seal carriage to a second velocity during the dwell time, wherein increasing the velocity of the end seal carriage results in an increased distance of the package from the tube.

14. The system of claim 13, wherein the end seal mechanism is in contact with the tube and in contact with the package during a first portion of the dwell time when the velocity of the end seal carriage is at substantially the first velocity.

15. The system of claim 14, wherein the end seal mechanism is no longer in contact with the tube and remains in contact with the package during a second portion of the dwell time when the velocity of the end seal carriage is at the second velocity.

16. The system of claim 13, wherein the end seal mechanism includes an upper jaw and a lower jaw.

17. The system of claim 16, wherein the computing device configured to control the end seal carriage to cause the upper and lower jaws to extend into an extended position at which the upper and lower jaws contact the tube.

18. The system of claim 17, wherein the computing device is configured to control the end seal carriage to cause the increase in the velocity of the end seal carriage to the second velocity after the upper and lower jaws reach the extended position.

19. The system of claim 17, wherein the computing device is further configured to control the end seal carriage to cause:
an end of the dwell time while the velocity of the end seal carriage is greater than the first velocity, wherein end of the dwell time includes retracting the upper and lower jaws from the extended position until the upper and lower jaws are no longer in contact with the package.

20. A non-transitory computer-readable medium having instructions embodied thereon for controlling a tube feeding system and an end seal carriage of a form-fill-seal system, wherein the instructions comprise instructions that, in response to execution by a computing device, cause the computing device to:
cause the tube feeding system to feed a tube of flexible material at a first velocity;
increase a velocity of the end seal carriage to substantially the first velocity, wherein the end seal carriage includes an end seal mechanism;
start of a dwell time of the end seal mechanism on the tube of flexible material while the velocity of the end seal carriage is at substantially the first velocity, wherein the end seal mechanism is configured to cut a package from the tube during the dwell time; and
increase the velocity of the end seal carriage to a second velocity during the dwell time, wherein increasing the velocity of the end seal carriage results in an increased distance of the package from the tube.

* * * * *